United States Patent
Silberstein et al.

(10) Patent No.: US 7,383,320 B1
(45) Date of Patent: Jun. 3, 2008

(54) METHOD AND APPARATUS FOR AUTOMATICALLY UPDATING WEBSITE CONTENT

(75) Inventors: Eric M. Silberstein, Cambridge, MA (US); Kenneth Y. Liu, Somerville, MA (US); Chung-Cheih Shan, Cambridge, MA (US); Jimmy J. Song, Cambridge, MA (US); Ryan S. Riney, Cambridge, MA (US); Andrew W. Pimlott, Cambridge, MA (US); Russell G. Ross, Cambridge, MA (US)

(73) Assignee: IDOM Technologies, Incorporated, Waltham, MA (US)

( * ) Notice: Subject to any disclaimer, the term of this patent is extended or adjusted under 35 U.S.C. 154(b) by 540 days.

(21) Appl. No.: 09/665,241

(22) Filed: Sep. 18, 2000

Related U.S. Application Data

(60) Provisional application No. 60/163,781, filed on Nov. 5, 1999.

(51) Int. Cl.
*G06F 15/16* (2006.01)
(52) U.S. Cl. .................................. 709/219; 709/217
(58) Field of Classification Search ................ 709/245, 709/217, 218, 219
See application file for complete search history.

(56) References Cited

U.S. PATENT DOCUMENTS

| | | | | |
|---|---|---|---|---|
| 5,675,802 A | * | 10/1997 | Allen et al. ................ | 717/103 |
| 5,813,007 A | | 9/1998 | Nielsen ........................ | 707/10 |
| 5,884,097 A | * | 3/1999 | Li et al. ....................... | 710/43 |
| 5,894,554 A | * | 4/1999 | Lowery et al. ............. | 709/203 |
| 5,978,828 A | | 11/1999 | Greer et al. ................ | 709/2.24 |
| 6,026,413 A | * | 2/2000 | Challenger et al. ......... | 707/202 |
| 6,041,333 A | * | 3/2000 | Bretschneider et al. ..... | 707/203 |
| 6,041,360 A | | 3/2000 | Himmel et al. ............. | 709/245 |
| 6,108,703 A | * | 8/2000 | Leighton et al. ............ | 709/226 |
| 6,122,666 A | * | 9/2000 | Beurket et al. ............. | 709/226 |
| 6,128,652 A | * | 10/2000 | Toh et al. .................... | 709/219 |
| 6,128,655 A | * | 10/2000 | Fields et al. ................. | 709/219 |
| 6,216,212 B1 | * | 4/2001 | Challenger et al. ......... | 711/163 |
| 6,219,818 B1 | * | 4/2001 | Freivald et al. ............. | 714/799 |
| 6,256,712 B1 | * | 7/2001 | Challenger et al. ......... | 711/141 |
| 6,356,903 B1 | * | 3/2002 | Baxter et al. ................ | 707/10 |
| 6,363,337 B1 | * | 3/2002 | Amith .......................... | 704/7 |
| 6,526,426 B1 | * | 2/2003 | Lakritz ....................... | 715/536 |

(Continued)

OTHER PUBLICATIONS

Challenger et al., "A scalable system for consistently caching dynamic Web data", INFOCOM '99. Eighteenth Annual Joint Conference of the IEEE Computer and Communications Societies. Proceedings. IEEE, vol. 1, Mar. 21-25, 1999.*

(Continued)

*Primary Examiner*—William Vaughn
*Assistant Examiner*—Joseph Maniwang
(74) *Attorney, Agent, or Firm*—Hoffman Warnick LLC

(57) ABSTRACT

A method of updating one or more target website data content items comprises providing one or more links, each of which associates one or more target content items with one or more original content items. The method further includes storing the links in a data storage device, and accessing the links in the storage device, and updating the target data content items according to the links. The method may update the target data content items at predetermined intervals, or on demand. Updating the target data content may further include initiating workflow to update the target data content.

23 Claims, 24 Drawing Sheets

U.S. PATENT DOCUMENTS

| | | | |
|---|---|---|---|
| 6,623,529 B1 * | 9/2003 | Lakritz | 715/536 |
| 6,725,333 B1 * | 4/2004 | Degenaro et al. | 711/118 |
| 6,973,656 B1 * | 12/2005 | Huynh et al. | 719/315 |
| 2002/0007383 A1 * | 1/2002 | Yoden et al. | 707/536 |

OTHER PUBLICATIONS

Challenger et al., "A publishing system for efficiently creating dynamic Web content", INFOCOM 2000. Nineteenth Annual Joint Conference of the IEEE Computer and Communications Societies. Proceedings. IEEE , vol. 2 , Mar. 26-30, 2000.*

Croll et al., "Content Management—The Users Requirements", International Broadcasting Convention, Conference Publication No. 447, Sep. 12-16, 1997□□.*

"The GNU Make Manual", Version 3.79, edition 0.55, Apr. 2000, Free Software Foundation, Inc.

Rational Software Corporation, "Introduction to ClearCase", Rational ClearCase, RElease 4.0, 1999.

Rational Software Corporation, "Administering ClearCase", Rational ClearCase Release 4.0, 1999.

\* cited by examiner

FIG. 3E

| 500 → | | | | |
|---|---|---|---|---|
| LINK DETAILS ID | SOURCE LANG | SOURCE ENC | TARGET LANG | TARGET ENC |
| | | | | |
| | | | | |
| ↑ 504A | ↑ 504B | ↑ 504C | ↑ 504D | ↑ 504E |

| 510 → | | | | |
|---|---|---|---|---|
| WORKFLOW SEQ ID | SEQ NO | NAME | WHO | WHAT |
| | | | | |
| | | | | |
| ↑ 514A | ↑ 514B | ↑ 514C | ↑ 514D | ↑ 514E |

| | MASTER PROJ ID | SLAVE PROJ ID | PROTO LINK LABEL | PROTO LINK TYPE | PROTO LINK STRING | PROTO LINK DETAILS |
|---|---|---|---|---|---|---|
| 520A | | | | | | |
| 520B | | | | | | |
| 520C | | | | | | |
| | 522A | 522B | 522C | 522D | 522E | 522F |

| | MASTER ID | SLAVE ID | LABEL | LINK TYPE | LINK DETAILS | DIRTY |
|---|---|---|---|---|---|---|
| 532A | | | | | | |
| 532B | | | | | | |
| 532N | | | | | | |
| | 534A | 534B | 534C | 534D | 534E | 534F |

METHOD AND APPARATUS FOR AUTOMATICALLY UPDATING WEBSITE CONTENT

CROSS-REFERENCE TO RELATED APPLICATIONS

This application claims the benefit of U.S. Provisional Application No. 60/163,781, filed Nov. 5, 1999, the contents of which are incorporated herein by reference in their entirety, and from which priority is claimed.

STATEMENT REGARDING FEDERALLY SPONSORED RESEARCH

Not Applicable

REFERENCE TO MICROFICHE APPENDIX

Not Applicable

BACKGROUND OF THE INVENTION

The present invention generally relates to data processing. The invention relates more specifically to methods and apparatus for automatically updating website content. One common technique for providing website content is via hypertext systems, although other techniques for providing website content are also known to those skilled in the art. Hypertext systems are used herein for exemplary descriptions, however other suitable techniques known in the art for providing website content may also be used and are equally applicable. For example, database records may be used to provide the content, without the use of hypertext links.

One particularly popular system involves the combination of hypertext information technology and distributed network technology and is known as the World Wide Web. A "site" on the World Wide Web ("Web site") is a set of hypertext information stored on a server that is coupled to the global, packet-switched set of internetworks known as the Internet. The hypertext information typically is created and stored in one or more electronic documents that are prepared using Hypertext Markup Language (HTML). The server and the network operate according to agreed-upon protocols such as Transmission Control Protocol (TCP) and Internet Protocol (IP). A networked end station such as a personal computer, workstation, or other device ("client") connects to the Internet using the same protocols, executes a browser program that can interpret and display HTML documents, and requests one or more pages of the Web site. The server locates the requested pages and delivers them over the network to the client, which displays them.

Any number of clients may access the server. When most of the clients are located geographically close to the server, or are within the region served by the server, this approach works adequately. However, when a significant number of clients are located geographically distant from the server, or outside a region that is served by the server, delays in the intermediate networks, nodes, and telecommunications systems that make up the Internet may cause unacceptably long delays in receiving pages from the server at the clients. This problem, along with rapid expansion of the international economy and the globalization of online business, has led many enterprises to establish multiple geographically distributed Web sites.

In one approach, a first Web site (often located in the United States or created using the English language) is established in a first location. One or more "mirror" Web sites are established in one or more other locations. Alternatively, the mirror sites are co-located but logically separated and serve different audiences within the same location or region. Each mirror Web site stores and serves an exact copy of the content of the first Web site. Periodically the mirror sites are updated by copying changed content from the first Web site to all the mirror sites. However, a significant disadvantage of this approach is that the mirror sites are not localized or customized according to the clients that they serve. Often the mirror sites are not rendered in the language used for communication by clients in the region served by the mirror sites. This results in an undesirable end user experience.

In a related approach, in a process called "localization," each local or regional Web site is customized according to local practices. Localization may also involve translation, in which each regional or local Web site is translated into the language of the region served by the site. However, the process of updating a large Web site that is mirrored and localized for multiple countries is complicated and time-consuming.

A related problem is that many Web sites now store and serve dynamic content. First generation Web sites generally consisted of a collection of static HTML pages; every client on every connection received the same pages from the server. Many Web sites now use HTML templates that are filled in with content from a database by the server dynamically just before delivery to a client. When the database is updated, pages delivered to clients automatically reflect the updates. Further, enterprises that still rely on static content often update the static pages frequently to reflect changes in information, products and services.

Content management systems have been developed to address this problem. A content management system seeks to organize Web site content and automate processes of data input, editing and revision, quality control review, and publication to multiple Web site. Some content management systems also provide personalization services, decision support services, and integration with other systems and applications. An example of a content management system is Vignette StoryServer, commercially available from Vignette Corporation, of Austin, Tex.

A drawback of known content management systems, however, is that they do not adequately address the problem of how to automatically update a translated or localized Web site when source documents or other source information underlying the translation or localization changes. In one approach, all Web site content is stored in a database. Translators access the database and translate content from the database into other languages for use in regional or localized Web sites. The databases tend to require storage of content in a highly structured form. This approach is adequate when an entire Web site is translated, but it is inadequate for carrying out selective changes on a site, or for translating a site that has extensive dynamic content.

In another approach, updated content of a first site is copied to a second site and then translated. This approach is best suited to making country by country modifications. However, it often results in inconsistent, ad hoc changes.

Based on the foregoing, there is a clear need in this field for an improved method or apparatus that provides automated updating of website content, in conjunction with, or without, a content management system.

There is a specific need for a method or apparatus that provides automated updating of translated Web sites or localized Web sites having highly dynamic, complicated and extensive site content.

There is also a need for such a method or apparatus that can automatically detect changes in a first set of hypertext information and automatically propagate the changes to a second set of hypertext information, with further changes that are appropriate for or associated with the context of the second set of hypertext information.

SUMMARY OF THE INVENTION

The foregoing and other objects are achieved by the invention which in one aspect comprises a method of updating one or more target website data content items. The method includes providing one or more links, each of which associates one or more target content items with one or more original content items. The method further includes storing the links in a data storage device, and accessing the links in the storage device, and updating the target data content items according to the links.

Another embodiment of the invention further includes updating the target data content items at predetermined intervals.

Another embodiment of the invention further includes updating the target data content items upon demand. In another embodiment, updating the target data content further includes initiating workflow to update the target data content.

Another embodiment of the invention further includes a source data item, wherein a first link associates the target content item with the source data item, and a second link associates the source data item with the original data item.

Another embodiment of the further includes one or more buffer data content items, wherein each link specifies zero or more buffer data content items to be used while updating the target data content items, and at least one link specifies at least one buffer data content item.

Another embodiment of the invention further includes one or more buffer data content items, wherein each link specifies zero or more buffer data content items to be used in the workflow to update the target data content items, and at least one link specifies at least one buffer data content item.

In another embodiment of the invention, the links include copy links and translation links.

In another embodiment of the invention, one or more of the links inherit properties from others of the links.

In another embodiment of the invention, the links support selective modification of the original data content items, so as to produce a corresponding target data content item for each of the original data content items.

In another embodiment of the invention, the links operate on top of an abstraction layer that interfaces to a data store having arbitrary characteristics.

In another embodiment of the invention, the target data items are arranged in at least two groups, and each of the links associates a group of target data items with a corresponding group of original data items, such that all data content items within a group of target data items are updated according to the associated link.

In another aspect, the invention comprises a system for updating one or more target website data content items. The system includes one or more links, each of which associates one or more of the target content items with one or more original data content items. The system further includes a data storage device for storing the links, and a processor for accessing the links in the storage, and updating the target data content items according to the links.

In another embodiment of the invention, the data storage device stores the links at a set of predetermined intervals.

In another embodiment of the invention, the data storage device stores the links upon demand.

In another embodiment of the invention, the processor further initiates workflow to update the target data items according to the links.

Another embodiment of the invention further includes a source data item, wherein a first link associates the target content item with the source data item, and a second link associates the source data item with the original data item.

In another embodiment of the invention, the links include copy links and translation links.

In another embodiment of the invention, one or more of the links inherit properties from others of the links.

In another embodiment of the invention, the links support selective modification of the original data content items, so as to produce a corresponding target data content item for each of the original data content items.

In another embodiment of the invention, the links operate on top of an abstraction layer that interfaces to a data store having arbitrary characterstics.

In another embodiment of the invention, the target data items are arranged in at least two groups, and each of the links associates a group of target data items with a corresponding group of original data items, such that all data content items within a particular group of target data items are updated according to the associated link.

In another embodiment of the invention, the data items within the particular group are arranged all at a common level.

In another embodiment of the invention, the data items within the particular group are arranged hierarchically at multiple levels.

In another embodiment of the invention, the processor executes a sequence of program steps that scan data content items and initiate workflow to update the target data items according to the links.

BRIEF DESCRIPTION OF DRAWINGS

The foregoing and other objects of this invention, the various features thereof, as well as the invention itself, may be more fully understood from the following description, when read together with the accompanying drawings in which:

FIG. 3E is a diagram of a graphical user interface for editing an existing project link;

FIG. 5A is a diagram of a link table;

FIG. 5B is a diagram of a workflow table;

FIG. 5C is a diagram of a proto link table;

FIG. 5D is a diagram of a link information table;

DESCRIPTION OF THE PREFERRED EMBODIMENTS

A method and apparatus for automating updating of website content is described herein. Although hypertext systems are used herein for exemplary descriptions, other techniques known in the art for providing website content may also be used. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Overview

In one embodiment, a process is provided for managing updates of translations and localizations of a Web site having extensive dynamic content. A particular problem addressed by an embodiment is how to update a translated or localized Web site as the source information that forms a basis of the translation and localization changes. A Web site administrator may use the process to set up an external site having translated content. Content management processes govern entry of new content, which must proceed through established review and translation and localization steps. A preferred embodiment is implemented in the form of one or more templates for StoryServer of Vignette Corporation, and the invention is described herein using this preferred embodiment as an example. However, the invention is not limited to this embodiment. The process is equally applicable to other contexts and commercial products, e.g., TeamSite from Interwoven.

Advantageously, embodiments of the invention simplify the construction and maintenance of multi-lingual or multi-locale Web sites, based on linkages that are established between resources, projects, and tasks in a content management system. Using linkage, resources are kept up-to-date and are synchronized with each other using linkage rules. In this context, "content management system" includes non-commercial Web site management systems, as well as systems of files that are organized in a directory or other file system according to some pre-determined organizational format that assists in content management. Other embodiments may be used without a content management system.

The descriptions in this document assume familiarity with content management systems in general. Further, descriptions of certain embodiments in this document are specific to StoryServer of Vignette Corporation, and these descriptions further assume familiarity with certain terminology that is specific to StoryServer. An overview of the StoryServer content management system and such terminology appears in "StoryServer 4 Overview," Revision 4.2, Stock No. SSG-0420-331, available from Vignette Corporation, which is hereby incorporated by reference in its entirety as if fully set forth herein.

Structure

Figure 1A:
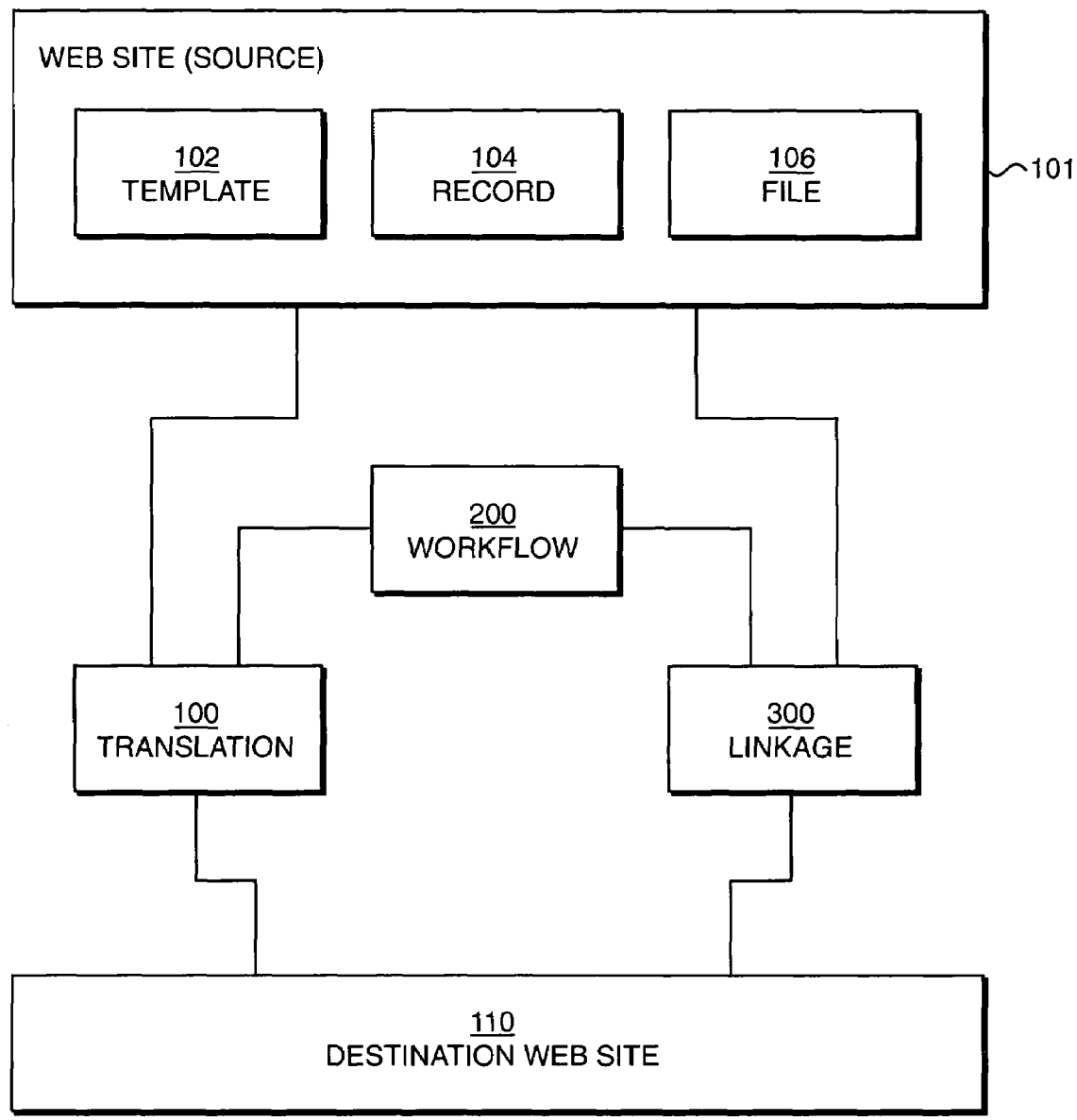
FIG. 1A is a block diagram of a hypertext system that uses linkage for automatic updating.

FIG. 1A is a block diagram that provides a structural overview of a preferred embodiment. Generally, a source Web site 101 interacts with a Workflow module 200, Linkage module 300, and Translation module 100 to result in creation of a destination or target Web site 110. Workflow module 200 coordinates translation and localization of the source Web site 101 based on relationships defined by Linkage module 300. Translation module 100 assists translators in translating a Web site by translating and validating one or more content objects (also referred to as "content item," "object," "resource," "asset," etc.), such as templates 102, records 104, or files 106. Workflow module 200 provides interfaces for ensuring the steps in the translation and localization process occur in the proper order and by the proper persons. Linkage module 300 provides a means for maintaining relationships between master and slave objects, so that workflow processes are invoked on slave objects when their master objects are updated. In this embodiment, objects and linkages are stored in a relational database system that is accessible to the modules.

In this context, "translation" means translating and optionally validating a content object, such as a template, a record, or a file. "Localization" means changing in tone without necessarily changing languages, and includes any adaptation of content, culturally oriented translation, removal of content that is inappropriate for the target, and/or addition of new (local) content that is specifically appropriate for the target. Examples of localization include, but are not limited to, local phone numbers, and local prices for goods and services. "Workflow" means utilizing task objects so that translation and localization are invoked on the right objects at the right time. "Linkage" means maintaining correspondence relationships between master and slave objects, so that workflow processes are invoked on slave objects when master objects are updated.

Figure 1B:
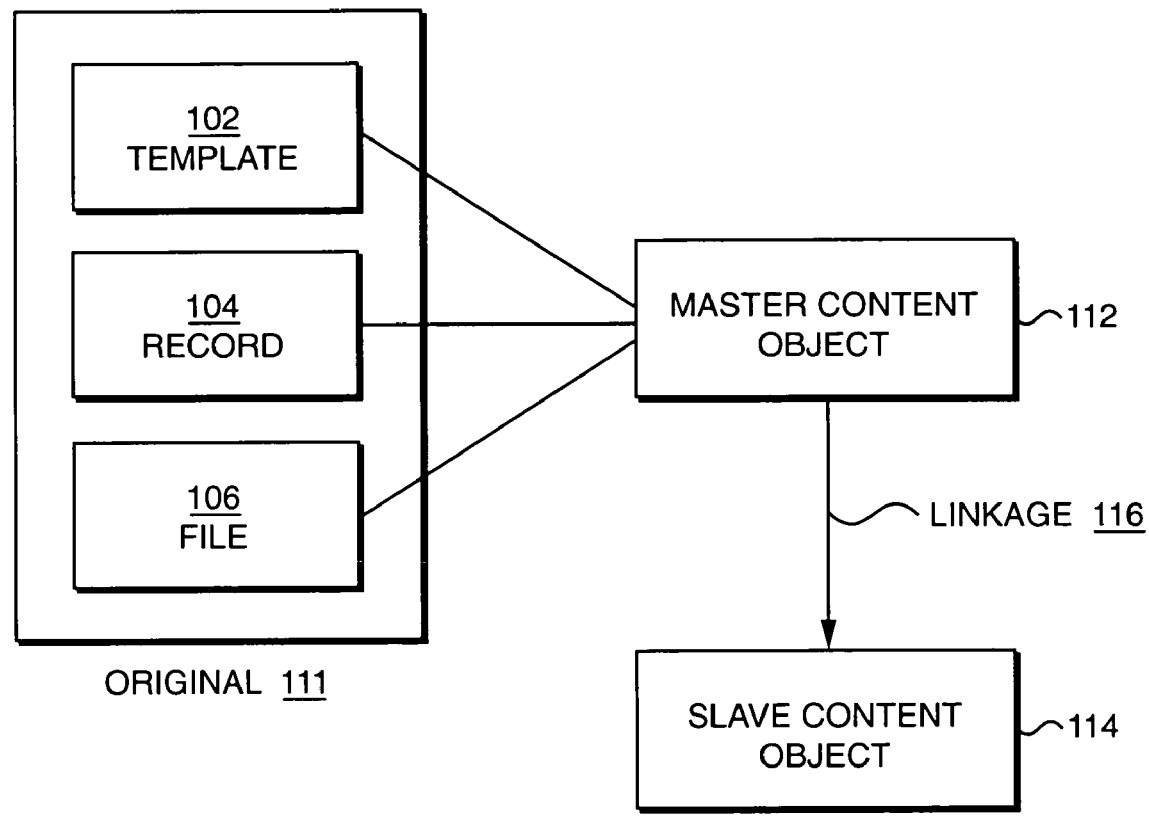
FIG. 1B is a block diagram of objects involved in linkage.

FIG. 1B is a block diagram showing relationships of objects used in a translation and localization system. Each original object 111 may be one template 102, record 104, or file 106, and is associated with an original Web site. Linkage 116 connects original content object 112 (as master) to source content object 114 (as slave). Linkage 116 also connects source content object 112 (as master) to translated content object 114 (as slave). A translated object is the complete translation of a source object, not an original object. Thus, slave content object 114 may be a translation of source content object 112, which serves as the translation source, but it is not necessarily an exact translation of original object 111.

If the content of a translated site never changes, the original object is always identical to the source object. When the original object changes regularly, however, the source object for a given translation or localization is the same as the original object after synchronization, which usually happens each time the translated site is updated. As soon as the original object is modified, the original object and source object are different, until the next synchronization.

Figure 2A:
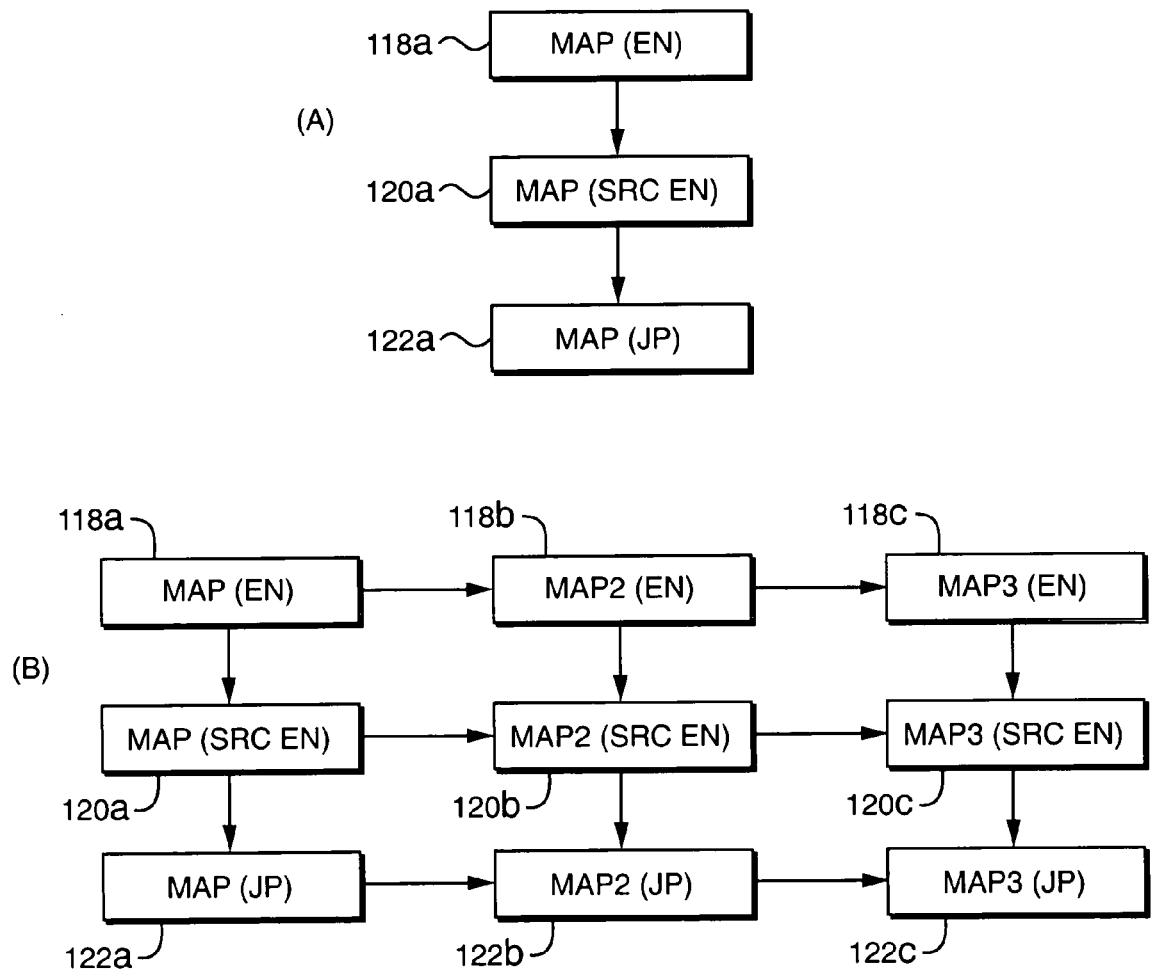
FIG. 2A is a two-part block diagram of relationships among linked and translated objects.

FIG. 2A is a two-part block diagram that illustrates an example of translating a Web site. For each content object of a Web site that is to be localized, a source object and a translated object are created and stored. For the example of FIG. 2A, assume that a company has an original English template for site maps on its central U.S. site, named map(en). This template includes a simple visual layout that all site maps can share, and also some text which should appear in all of them, e.g., a copyright notice at the bottom, a navigation bar off to one side, the company's logo with an English motto, etc. The U.S. site's content forms the basis for a number of sites in other countries, and one translated site map template will correspond to map(en) for each version of the site. FIG. 2A shows linkages between the U.S. site and a Japanese site assuming that the central English template never changed. Each vertical arrow here represents a link between two objects.

The original object, for example, a template for an English language Web site located in the United States, is exemplified by original object 118a of FIG. 2A, part (A). A translated object, such as the corresponding template of a Japanese site, is translated object 122a. Because translation or localization takes time for a person or process to perform, the translated object might be a translation or localization of an old original object, so that the translation may lag behind the original. In such a case, the old original object is called the source object 120a. FIG. 2A, part (A) illustrates an idealized system in which content never changes, so that original object 118a is identical to source object 120a.

FIG. 2A, part (B) illustrates relationships of objects for which content changes, but translations and localizations are always up to date. Original object 118a is revised into original object 118b and later into a third revision, original object 118c. Each rightward-pointing arrow represents a revision to an object, which may involve multiple workflow steps such as translation or localization followed by validation followed by legal check. As such revisions occur, the linkage processes and mechanisms described in this document cause source object 120a to be revised into a second source object 120b and a successive source object 120c. Translated objects 122a, 122b, 122c are revised in a complementary manner. In another alternative, content changes and translations or localizations are not always up to date.

In practice, original objects, source objects, and translation objects are stored in different projects of the content management system. An original object may be linked to multiple sources. For example, both a Spanish Web site and a Japanese Web site may have a product information page that is translated from an English original. As the original site is updated on an ongoing basis, the two translations would not necessarily be revised at the same time. Therefore, there would be two sources, one for each translation.

A source object also may be linked to multiple translation objects. For example, assume that a Spanish product information page and a Japanese product information page are always translated from the same revisions of a corresponding English product information page. As the original is updated on an ongoing basis, the two translations would always be revised at the same time. In this case, one source object is linked to both translation objects.

Links may represent transformations of objects as opposed to representing a copy operation among objects. Further, links may couple objects in configurations other than among an original object, source object, and target object. For example, links may connect an original object to a copy of an object that is intended to be reviewed by an administrator or transformed into a different version in a particular language or for a particular region. Links may inherit properties from other links, either by using intrinsic inheritance mechanisms of object-oriented programming languages, or by a different inheritance mechanism.

Links may also support selective pushing and pulling of content. A site manager, who is responsible for a particular Web site, may need selective power to modify the site. For example, assume that a site manager of a German site has control over German content. An effective linkage system may involve linkages that terminate on the German site without the involvement of a manager of a corresponding United States site. For example, the German site manager might create a press release section in which hyperlinks point to press releases in the United States site and a particular workflow is enforced. Alternatively, the German site manager might set up material on the German site that is loosely adapted from particular material on the United States site, using a soft ("dotted line") linkage from the United States site.

Further, the German site manager may desire not to have German site content updated whenever something changes in the United States site, or at the whim of the United States site manager. Instead, the German site manager may choose to selectively pull content from the places that are linked to the German site. For example, the German site manager might choose to pull everything under the "press" directory of the United States site and thereby update everything on the German site with that content. As a particular example, assume that a Web site content area "US/press" is linked to "Germany/press" and "France/press." If the German site manager executes a "pull" operation, "German/press" will be updated, but nothing will happen to "France/press." However, if the United States site manager executes a "push" operation, then both the Germany and France sites will be updated. Both pulls and pushes can be done manually from a graphical user interface, or automatically using a trigger, cron job, or equivalent mechanism.

In still another embodiment, links can be run on top of an abstraction layer that interfaces to a data store having arbitrary characteristics. For example, linkage can work on top of a database as well as a file system as well as a proprietary text file containing strings. This may be achieved using a linkage file system abstraction layer ("IFS" or "Idiom File System"). The linkage file system abstraction layer maps any underlying data into an ipath or idiom path. For example, "filesystem/a/b.html" might refer to a file called b.html in directory a, and "database/people/15" might refer to a database row in table people with primary key 15. An application can have connectors that link anything into the IFS system. The linkage file system abstraction layer also has support for doing comparisons so you know when to update, and allows an application to link, e.g., a file to a database table. In such an embodiment, management identifiers are not used to identify objects in the underlying data store.

Figure 1C:
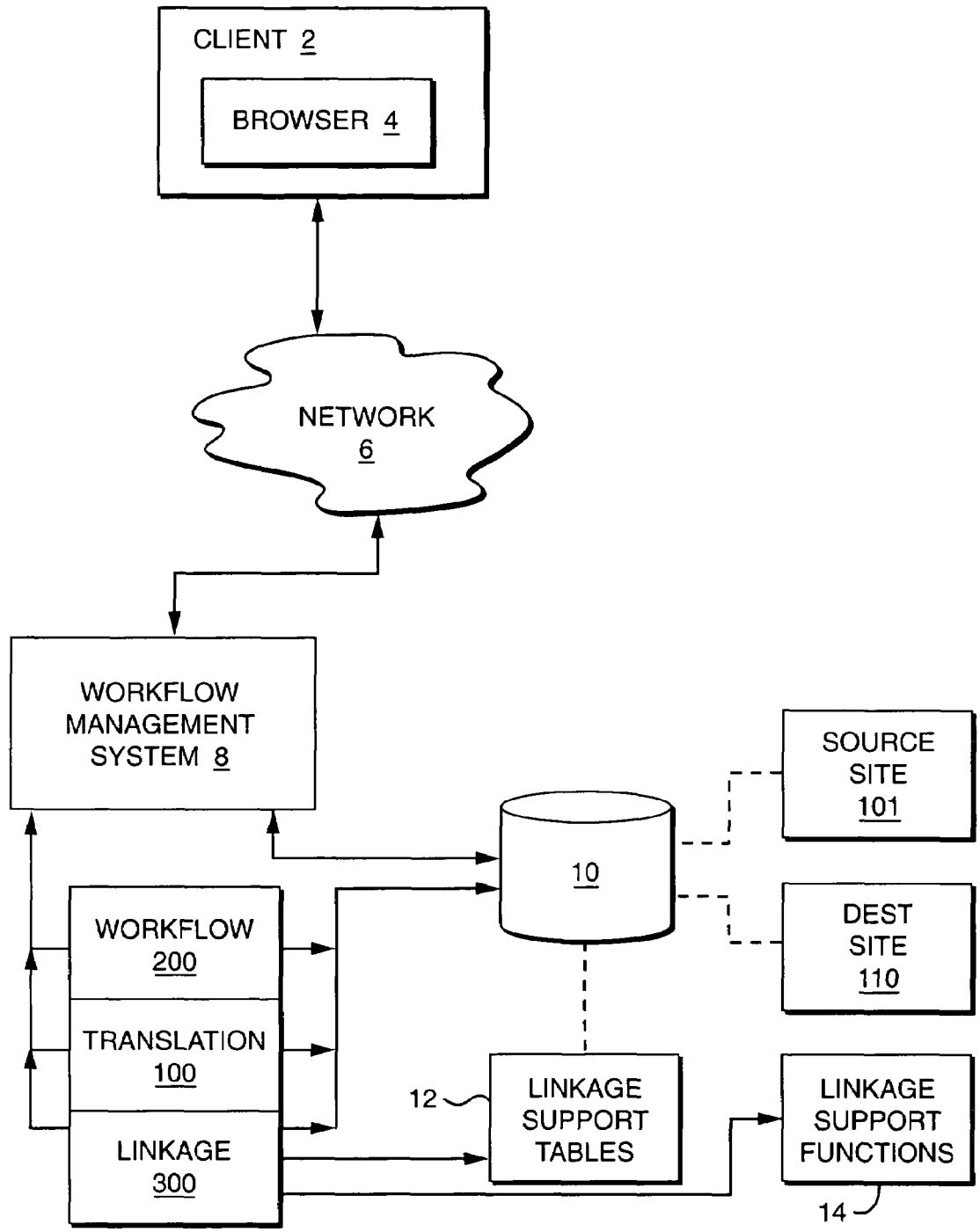
FIG. 1C is a block diagram of a content management system in which an embodiment may be used.

FIG. 1C is a block diagram showing an exemplary content management system with which one preferred embodiment of the present invention may be used.

Client 2 executes browser 4 and is coupled to network 6. Client is any network end station such as a personal computer, network computer, or workstation. Browser 4 is an application program that can receive and display pages using protocols and formats of a network, for example, the World Wide Web and Internet. Examples of commercial products that are suitable for use as browser 4 include Netscape Navigator, Netscape Communicator, Internet Explorer, etc. Network 6 may be a local area network, wide area network, or the global, packet-switched network of internetworks known as the Internet.

Content management system 8 (also referred to herein as "workflow management system") is coupled to network 6 and can communicate with browser 4 over network 6. An example of content management system 8 is StoryServer of Vignette Corporation. Content management system 8 is coupled to a database 10 that stores Web sites in the form of projects with associated content objects such as templates, records, and files. Examples of projects original source Web site 101 and translated Web site 110.

Workflow module 200, Translation module 100, and Linkage module 300 are coupled to content management system 8 and to database 10. In an embodiment, the modules 100, 200, 300, extend and complement the content management system 8 and are implemented as executable code in project templates. One or more linkage support tables 12 are coupled to the Linkage module 300 and may be stored in database 10. Linkage support tables 12 provided a database schema and non-volatile storage that is customized for use in linkage operations. One or more linkage support functions 14 are coupled to Linkage module 300. The linkage support functions 14 are one or more computer programs, subroutines, or library functions that implement elements of Linkage module 300.

Workflow Module

"Workflow" is a systematic process for ensuring that all the steps required between content creation and final launch of one or more Web site content objects are carried out in order, while allowing for flexibility along the way to ensure that the end result is as desired. In this embodiment, workflow includes a sequence of tasks that are required to be performed in order. Generally, many such sequences progress in parallel at the same time, one for each content item.

Each content item has associated workflow information. In this embodiment, the workflow information (designated "workflow") is a linear series of tasks to be performed on a content item. There are no divergent workflow paths ("branches"); at any one time only one task is open for a content item. In one embodiment, there is no mechanism for moving backwards in the workflow sequence; the only related option is to reset the workflow for the item, which starts the workflow process over from the beginning. Alternatively, and in the preferred embodiment, the user may modify the workflow midway through the workflow. For example, when completing a task, a user may opt not to send the item directly to the next step but may instead send it back to the previous step for additional review.

In this embodiment, each task is either a user task or a program task. A user task is assigned to one or more users or groups. A program task is an automated part of the workflow process, for example, an HTML syntax checking program or a program which copies content from a development server to a production server. Only one user can actually start a user task and perform the action it requires. Once a person assigned to a task officially starts it, no other users may start the task (though they may, of course, work on it unofficially).

When a task is complete, the individual who has completed the task enters information in content management system 8 that informs the system that the task is finished. In response, the next workflow task is initiated, either by running a program, if it is a program task, or assigning the task to users or groups if it is a user task. Preferably, actions such as Start a task and Finish a task are linked to a Web interface that facilitates the tasks. This streamlines the workflow process and provides a single interface for use in accomplishing tasks.

A user may add notes to tasks in the form of comments that are stored in database 10 in association with tasks. Preferably, comments may be edited in a Details dialog, a User Task List and a Finish Task screen of the Web-based workflow interface.

Translation Module

Translators and validators both use a Web-based translation interface ("Translation Workbench"). A translate task and a validate task automatically launch the Translation Workbench when they are started, for example, when a user to whom they are assigned selects a Start link.

The translation module also includes a library of functions that use database 10 to handle the content being translated or localized. When any Translate task starts, the task transitions the user to a translation interface and loads it with the content of the relevant object. If the object has not been modified to include the source and target language character encodings, the translation interface will produce an error. The object is decomposed into text blocks, HTML blocks, and blocks that are not visible in the source of the viewed document by the translation module. These extracted phrases are presented to the translator for translation through the translation interface.

Linkage Module and Links

General

A link is a directed relation from an object (the master object) to a second object of the same type (the slave object), and further comprising a "link type" value, a "link details ID" value, and a "label" value. The label value is a string that can be used for identification and selection purposes. Two link type values include "copy" or "translate," although other link types may also be used. Copy links describe a relationship between two objects where all content and object attributes are reproduced exactly, with certain exceptions. The exceptions include object names, paths, primary keys for database content, etc. For most purposes, one can consider the slave an exact copy of the master in a copy-linked pair of objects. Translate links describe a relationship between two objects where certain attributes are copied, while others are modified through a translation workflow or some other workflow. There can be different kinds of translate links. For example, the translation workflows or other workflows associated with translate links can be described by unique phrases, such as "Japanese, legal, bimonthly", or "Spanish news articles". The link details ID value, used only in the case of translate links, is an integer that identifies the specific kind of translate link.

Proto Linkage is the relationship between two projects, a master project and a slave project, which describes how slave objects and object links will be automatically created for items in the master project. As with object links, project links can be of type "copy" or "translate". Proto linkage automates the creation of the slave items and the linked workflow sequences necessary for automated workflow to occur.

In FIG. 2A, each downward link relates a master object (an original object or a source object) to a slave object (a source object or a translation object). Slave objects change in accordance with the changes to their master objects. The links from original to source are copy links, so that when copy links are updated, the master object is copied to and overwrites the current copy of the slave object. The links from source to translation are translate links. When translate links are updated, tasks are created and appended to the workflow of the slave object. Conceptually, these tasks describe how the slave object is to be updated so as to correspond to the changed contents of the master object.

Each content object has two identifier values called an object ID and a management ID. In addition, templates and records are each identified by a database key, which is defined as the primary key in the template table or the primary key in the table containing the record. Templates and files also may be identified by the Web site paths to which they are published. However, there can be multiple or zero paths per content object. Alternatively, a single asset identifier may be used to identify content objects.

Figure 2B:
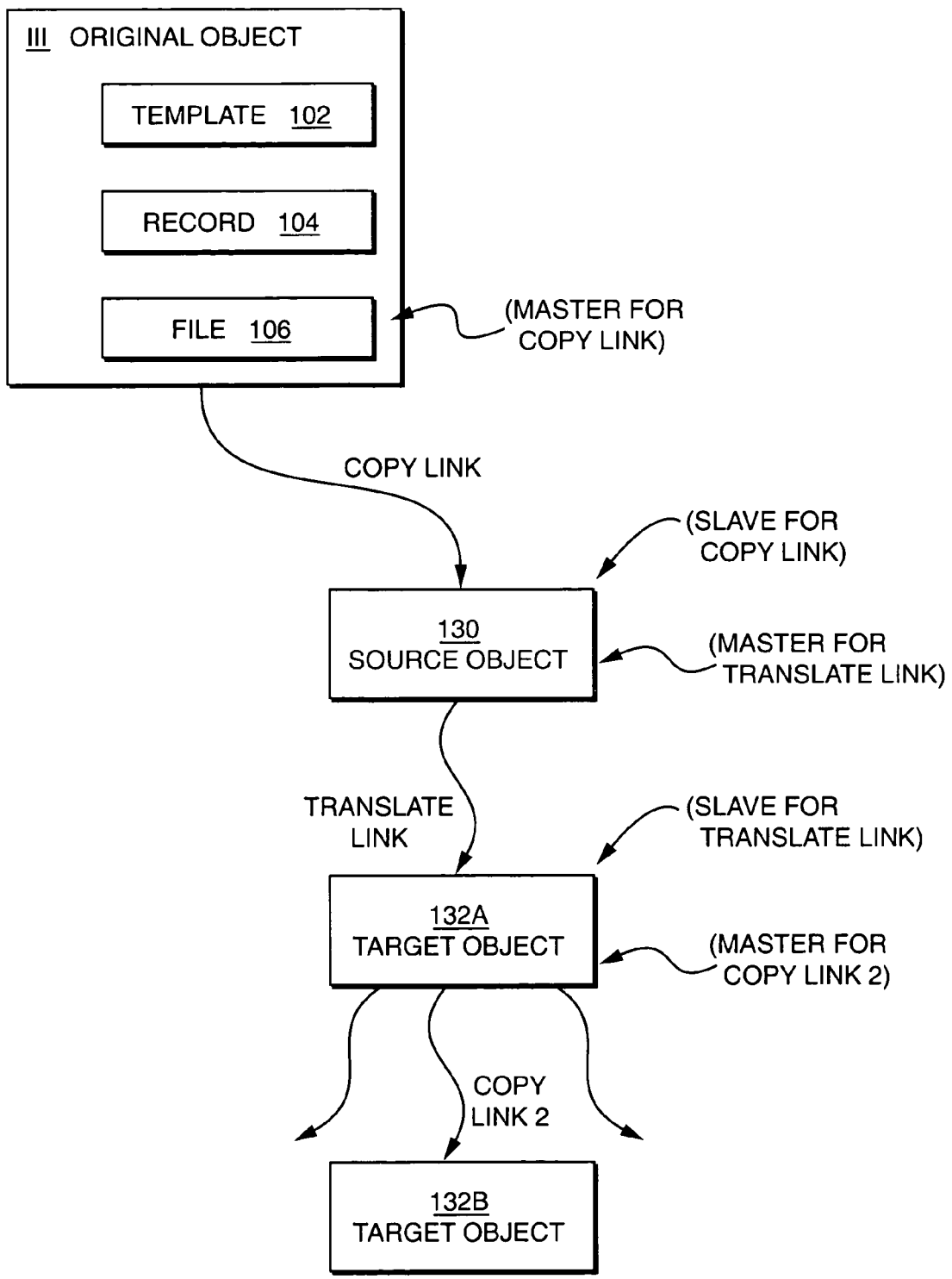
FIG. 2B is a block diagram illustrating copy links and translate links.

FIG. 2B is a block diagram illustrating copy links and translate links in relation to master objects and slave objects.

For the purposes of linkage, content items that are involved in linkage are categorized as three types of objects: original objects, source objects, and target objects. In one embodiment, original object 111 is linked by a copy link to source object 130, which is connected by a translate link to a first target object 132A. A second copy link connects first target object 132A to a target object 132B. Alternatively, the second copy link and target object 132B are omitted. Original objects are the templates, records, and files which comprise the original site in its native language and locale (usually, but not necessarily, English) and only act as master objects of copy links. Source objects are almost exact replicas of original objects. They are always slave objects in copy links, and always master objects in translate links. These objects act as a buffer between original content items and target objects. Target objects are translations of the source objects. It is possible for target objects to be the originals in a second tier of copy links.

The essential function of links is to propagate updates of objects. Updating a link invokes operations that bring the slave object up to date with changes in the master object. Specifically, when a copy link is updated, the master object is compared to the slave object. If the master object is different from the slave object, the slave object is overwritten with information from the master object. Alternatively, only the parts of the slave object containing language-specific content are overwritten with corresponding parts of the master object. Further, the slave object's own links (i.e., any other links of which the slave of the current link is the master) are updated recursively.

If the link is a translate link, certain workflow steps are appended to the workflow of the slave object in the content management system. The workflow steps that are appended depend on the link details ID value of the link. In one embodiment, a link update sets due dates intelligently when creating new workflow tasks on the slave object. In addition, the languages and character encodings of the master object and the slave object are stored in the database. The link details ID value of the link specifies how the slave object is updated when the master object changes.

Information defining links is stored in a Linkage Table in the database. Specifically, information defining translate links is stored in a Translate Link Table and a Workflow Sequence Table. In addition, other database tables that are managed by Linkage Module 300 contain a "language" column. Each translate link in the Linkage Table indexes into a row in the Translate Link Table, which specifies the source language, source character encoding, target language and target character encoding for translation. Each row in the Translate Link Table in turn indexes into the Workflow Sequence Table, which specifies the workflow steps that need to be executed for translation or other localization to take place and for the slave object to be brought up to date with the master object.

Each slave object has a single master object, but a master object can have multiple slave objects. Preferably, links do not form loops; a sequence of objects $o_0, o_1, o_2, \ldots, o_n$ such that $o_0 = o_n$ and $o_i$ is the master of $o_{i+1}$ for all i, is prohibited.

When an object is deleted, all links involving that object are automatically deleted.

Proto Links

To create new slave objects and links automatically using newly created or existing objects as corresponding masters, a high level relationship between projects is defined by proto links. All objects that exist or are created in projects that are masters of proto links will inherit the linkage of the proto links. A proto link is a directed relation from one project (the master project) to another project (the slave project). Each proto link further comprises a link type value, a link details ID value, and a label value, as well as a string value that defines how to create specific slave objects. When an object in the master project is created, the proto link causes the linkage module to create a corresponding object in the slave project and create a corresponding link between the two objects. The resulting link can be manipulated like any other link. When a project is deleted, all proto links involving that project are automatically deleted. Moving objects or projects between projects does not affect links or proto links in which they are involved.

In the preferred embodiment, information associated with proto links is stored in a proto links database table. FIG. 5C is a diagram of an embodiment of a proto links table 520 comprising rows 520A, 520B, 520C, etc. Each row comprises a Master Project ID column 522A, Slave Project ID column 522B, Proto Link Label column 522C, Proto Link Type column 522D, Proto Link column 522E, and Proto Link Details column 522F.

The values of Master Project ID column 522A and Slave Project ID column 522B are management identifier values corresponding to the linked projects. Like object links, proto links can have a Proto Link Type value of either of "copy" or "translate". Proto links of type "translate" have a non-NULL value for Proto Link Details, which is used to create object links. The Proto Link Label value is a non-NULL string used in naming the slaves of master objects as they are created. The Proto Link String value is an arbitrary string that includes information about code to be invoked when creating slave objects.

Figure 4A:
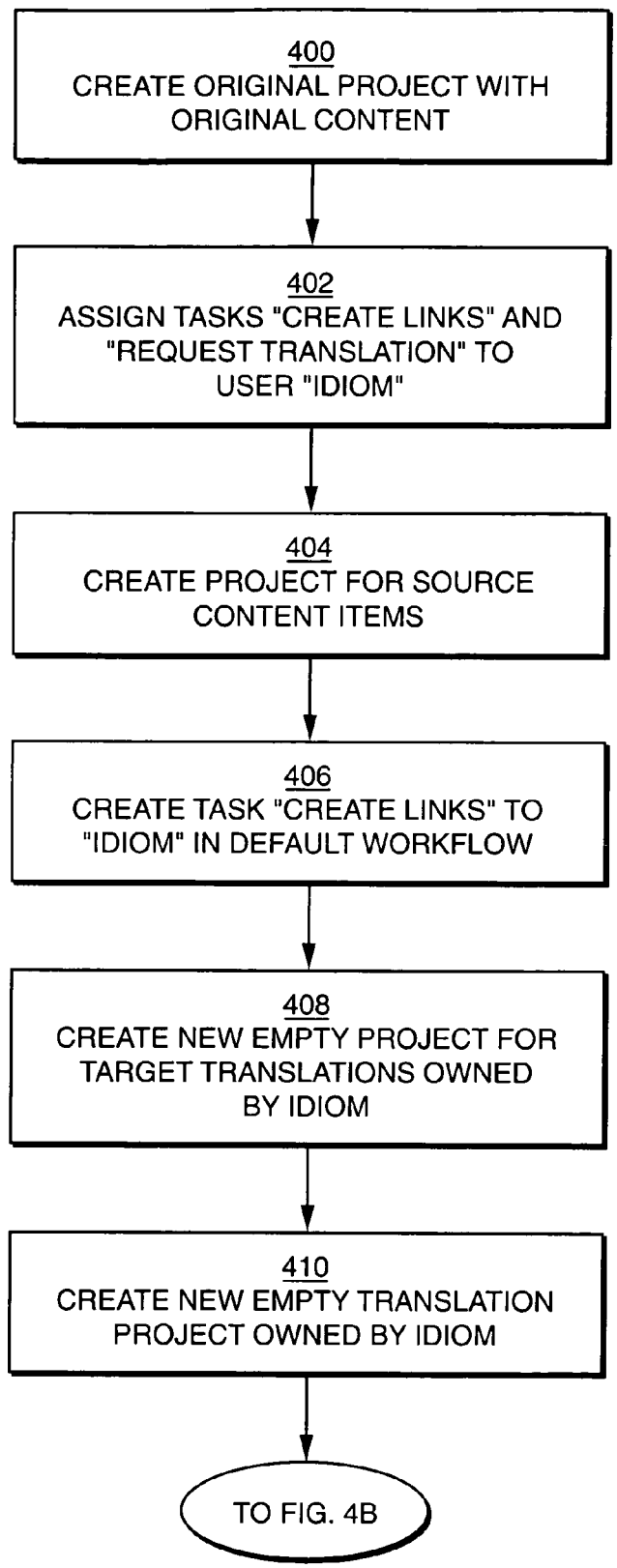
FIG. 4A is a flow diagram of creating projects for use in linkage.
Figure 4B:
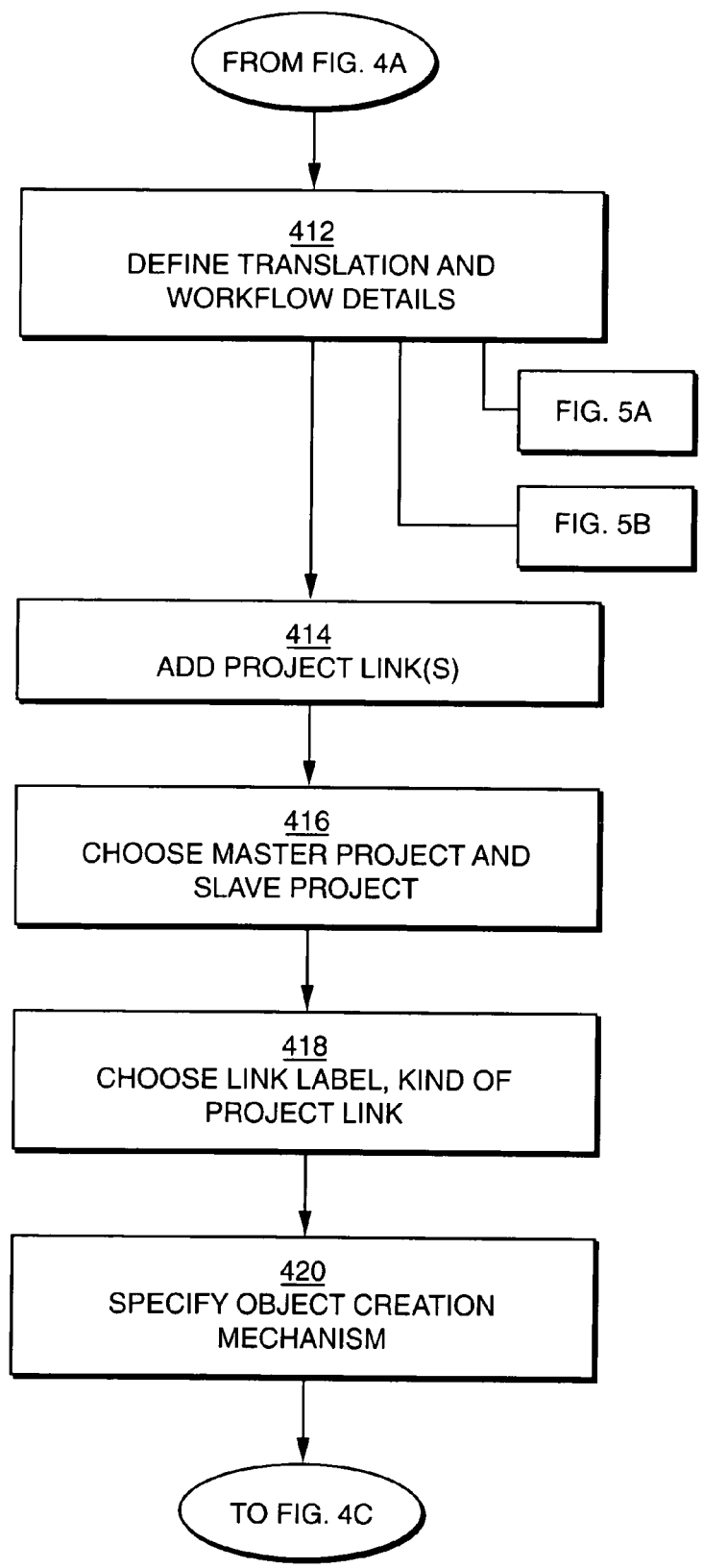
FIG. 4B is a flow diagram of creating and applying links.
Figure 4C:
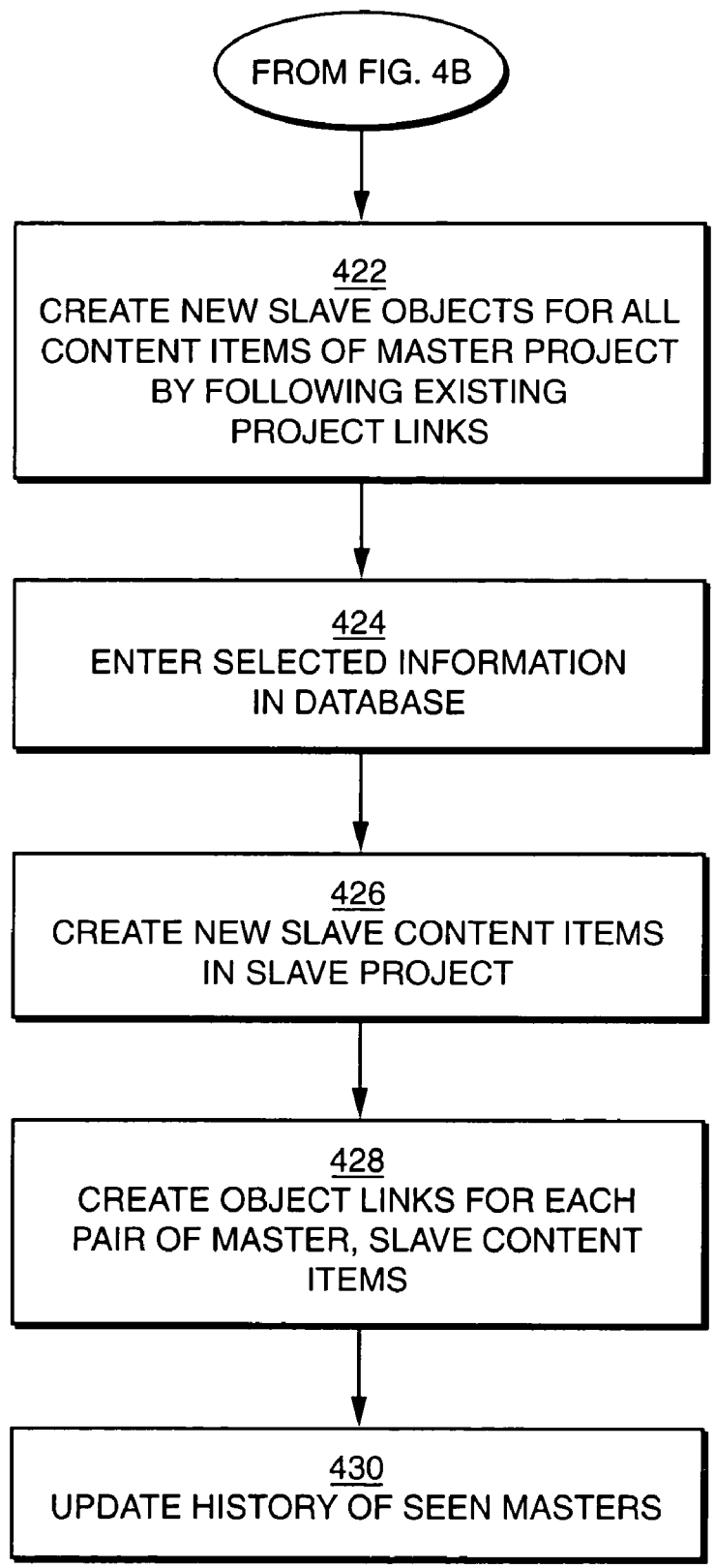
FIG. 4C is a flow diagram of further steps in the process of FIG. 4A.
Figure 4D:
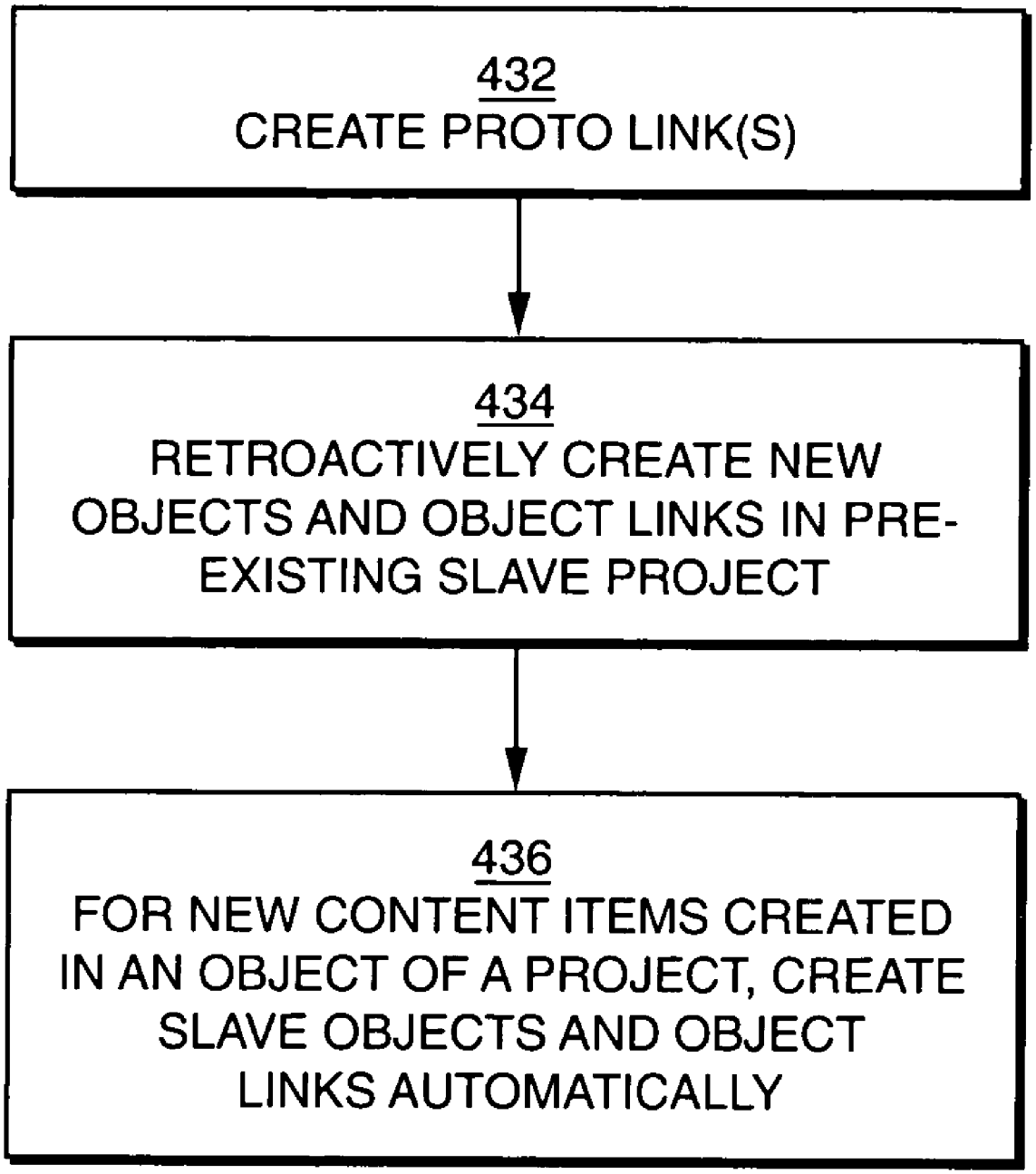
FIG. 4D is a flow diagram of a process of creating proto links and propagating changes based on proto links.

FIG. 4D is a flow diagram of a process of creating and using proto links. In block 432, one or more proto links between projects are created. Each Proto Link has two functions. As shown by block 434, a newly created Proto Link will retroactively create new objects in the slave project of the newly created proto link and object links between the existing objects in the master project of the newly created proto link and the newly created objects in the slave object of the newly created proto link. For example, assume that project Foo has content items foo1, foo2, etc. The user creates a Proto Link between project Foo and another project called Foo-JP. When creating the Proto Link, all the master objects in Foo are linked to newly created slave objects in Foo-JP. However, other proto links are not used to create new slave objects.

In block 436, after the proto link has been created and for the duration of existence of the proto link, for all new content items that are created as an object in the master project of the proto link, slave objects and object links are created automatically. Thus, a second function is to automatically create slave objects and object links for objects that are created in a project with one or more proto links specifying the project as their master project. To accomplish this, a function (the Notice Linkage function) is called to look for new content items in the system, for example, content items that are not identified in the Seen Masters table. When new content items are found by this function, the Proto Linkage table is consulted, and new objects and links are created in all Slave Projects with proto links from the Master Project. Each time a management task is performed, the Notice Linkage function is carried out immediately before the management task is initiated. Examples of management tasks include creating a Proto Link, accessing Linkage Module GUI, or initiating a workflow task. The Notice Linkage function, described further below, is a way to provide the accurate state of the Linkage Module with the appropriately created slave objects.

In the above example, the Master Project contains existing objects that may or may not have existing links or proto links to other projects. Suppose that the user now creates additional objects in the Master Project. The Notice Linkage task determines that the new objects are not in the Seen Masters table, and adds new objects and object links to all Slave Projects that have proto links from the Master Project. Suppose that the user then creates a new Proto Link from Foo to Foo-JP. Slave objects and object links are then created in Foo-JP for all the objects in Foo, which are now in the Seen Masters table. However, no object or link creation is performed for the other Proto Linked projects.

The slave objects are created before the Proto Link, they are noticed, and then retroactively created in the Slave Project as existing masters. If the Proto Link is created before the new master objects, the Notice Linkage function that is called when a management task is performed will notice the slave objects and links for the new master objects for all Proto Linked projects.

When creating proto links, the default workflow for all content items in the master project should include the task "create links" for the user "idiom" and the task "request translation" for the user "idiom". Both tasks are required, in that order, for an original project that serves as a master of one or more copy links. Only "create links" is required for source projects as a master of one or more translate links and a slave of a copy link. The addition of "create links" at the beginning of the workflow for these projects allows the Notice Linkage function, described further herein, to be called on items in the projects, so that slave creation and object link creation will occur automatically when a new content item is created in a master project.

Linkage Tables

Linkage is invoked whenever a content update occurs. A request to carry out translation using the content management system will invoke the linkage process. A pseudo-user is established and workflow steps that carry out linkage are assigned to that pseudo-user.

Figure 5E:
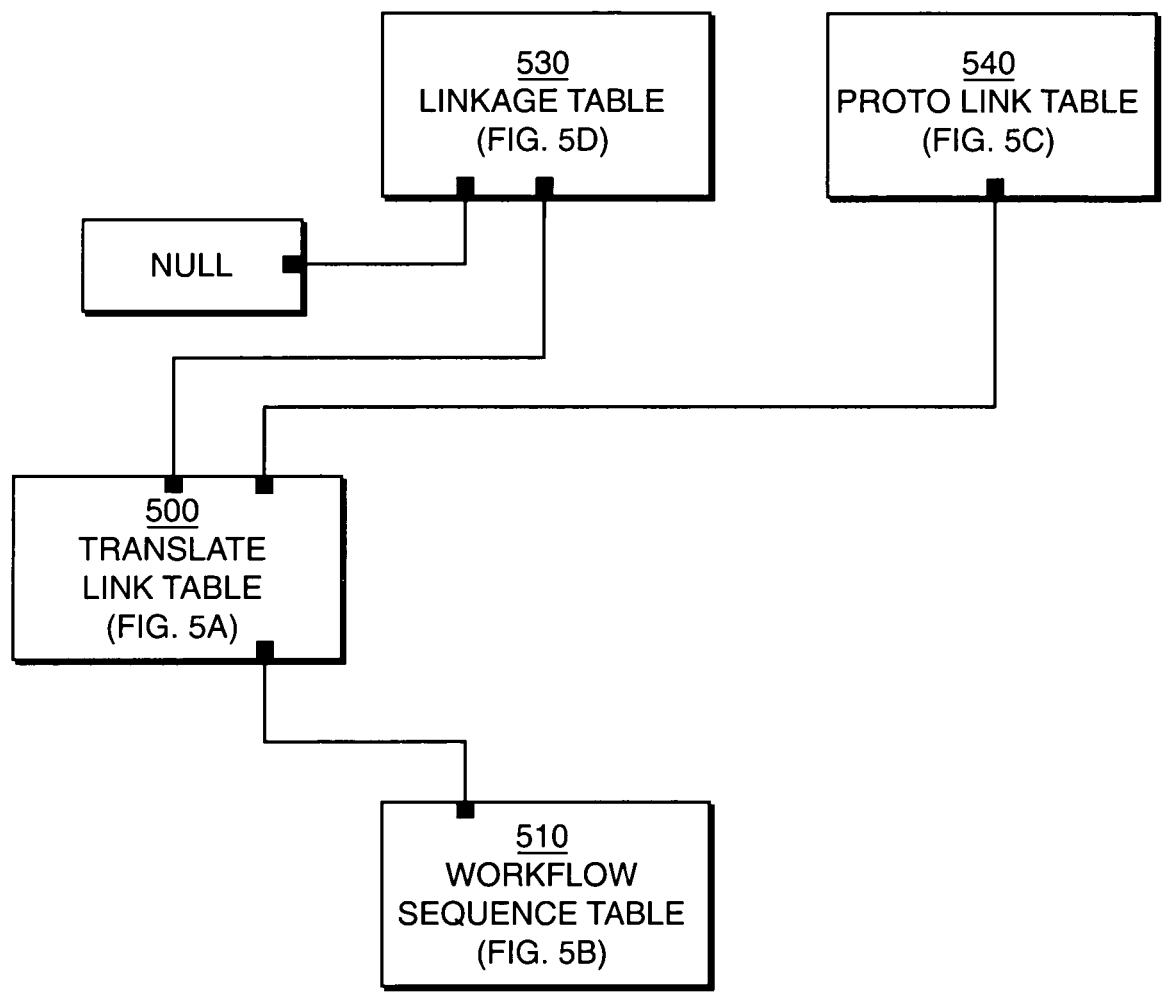
FIG. 5E is a diagram of a table schema.

FIG. 5E is a diagram of a table schema. Generally, Linkage Table 530 describes links and is associated with either a null value or to Translate Link Table 500 according to the type of link described in Linkage Table 530. Translate Link Table 500 is linked to Workflow Sequence Table 510. Proto Link Table 540 is linked to Translate Link Table 500. Details of the foregoing table linkages are described further below.

FIG. 5D is a diagram of the structure of an embodiment of the Linkage Table. Linkage Table 530 stores each link as a table row in rows 532A, 532B, 532N, etc. Each row comprises a Master ID column 534A, Slave ID column 534B, Label column 534C, Link type column 534D, Link Details column 534E, and Dirty column 534F. The Link Type column 534 stores a value of "copy" or "translate". The Link Details column 534E is a key into a secondary, per-type table, described further in this document, containing additional information about the link. For translate links, the secondary table is the Translate Link Table; for copy links, the value of the Link Details column is NULL.

In an embodiment, values for Label column 534C are obtained from a Proto Link table as described further herein. This mechanism is used because the label is most likely the language for translation, i.e. 'jp' or 'pl', and exists primarily to provide a logical name to objects in a translation project.

FIG. 5A is a diagram of the structure of an embodiment of the Translate Link Table. The Translate Link Table has row entries describing how a master object will be translated or localized into a slave object in a translate link. The table does not affect copy links. Each row 502A, 502B, 502C, etc., of Translate Link Table 500 stores details of a kind of translate links. Translate Link Table 500 comprises a Link Details ID column 504A, Source Language column 504B, Source Encoding column 504C, Target Language column 504D, Target Encoding column 504E, and WorkflowSeqID column 504F. Values of the Workflow Sequence ID column 504F index into the Workflow Sequence Table, which specifies workflow steps that are taken for a particular kind of translate links.

Link Details ID column 504A stores a value that serves as the primary key of the table and that can be used to quickly index into this table from the Linkage table. The Source Language column 504B stores a two- or three-letter abbreviation for the language of source object (for example, "en" for English, etc.) The Source Encoding column 504C stores a value indicating the character encoding of the Source Language. For example, the integer value 1252 may indicate the Windows-1252 character encoding, etc. The Target Language column 504D stores a two- or three-letter abbreviation for the language of the translated object (for example, jp for Japanese, etc.). The Target Encoding column 504E stores a character encoding of the Target Language. For example, 932 may indicate the Shift-JIS character encoding, etc. A Comments field may comprise a string used in a user interface for describing what kind of translation or localization and workflow is associated with the entry in the table.

Example values of a Translate Link table could be:

| 1 | en | 1252 | jp | 65001 | 2 | Translate to Japanese |
|---|----|------|----|----|---|---|
| 2 | en | 1252 | jp | 65001 | 5 | Translate to Japanese (Hopper) |
| | | | | | * | |
| | | | | | * | |
| | | | | | * | |
| 777 | en | 1252 | de | 1252 | 4 | Translate to German |

FIG. 5B is a diagram of the structure of an embodiment of the Workflow Sequence Table. Row entries describe the workflow sequence of steps for zero or more translate link types. Sequences of steps are specified in Workflow Sequence Table 510, which has rows 512A, 512B, 512C, etc. Each row has a WorkflowSeqID column 514A, SeqNo column 514B, Name column 514C, Who column 514E, and What column 514E. WorkflowSeqID column 514A stores work flow sequence identifier values for reference using the Translate Link table. SeqNo column 514B stores a value indicating the step number in sequence for this workflow for the translation or localization it is referred to.

Name column 514C stores values of the name of a particular workflow task. Who column 514E stores values that identify which person in the organization carries out the identified task. What column 514E stores an optional description of the task, for example, instructions to be provided to the individual identified in Who. In one embodiment, Who column 514E identifies a natural person of a People task. Alternatively, Who column 514E identifies a Program task. The translator and the validator of a workflow are the Who of workflow steps named "translate" and "validate," if present, respectively.

As an example, a Workflow Sequence table may store the following:

| 1 | 1 | translate | shankar       | <NULL>                   |
|---|---|-----------|---------------|--------------------------|
| 2 | 1 | translate | shinji        | <NULL>                   |
| 2 | 2 | validate  | hiroki        | <NULL>                   |
| 3 | 1 | translate | russross      | <NULL>                   |
| 4 | 1 | translate | sethr         | <NULL>                   |
| 4 | 2 | validate  | sriney        | <NULL>                   |
| 5 | 1 | translate | HopTransGroup | Translate hopper content |
| 5 | 2 | validate  | akira         | Validate hopper content  |

When link update and translation operations occur for record objects in database tables, different columns of records in the tables are treated differently. When slave objects are automatically created by a Create Slave function, described further herein, different columns of records in the tables are also treated differently. Some columns are not modified by link update and translation operations, for example, primary key values and language column values. The Create Slave function may initialize some of these columns in newly created slave records by calling the GET_NEXT_ID function in the content management system. The Create Slave function may initialize some of these columns in newly created slave records using the target language specified in the Translate Link Table. Some columns are copied verbatim by link update, translation operations and the Create Slave function, for example, catalog numbers and prices of products in objects used in commerce transactions. Some columns are copied by link update and the Create Slave function, but translated by translation operations. Other transformations may be used. In one embodiment, code that processes the record carries out such transformations.

To accommodate these possibilities, a Data Configuration table contains a row for each column in each table containing records that are involved in linkage, and has a column called LocalizationMethod. The value of the LocalizationMethod column indicates which type of transformation should be applied to each column in each table containing records that are involved in linkage by link update, translation operations and the Create Slave function, selected from among the three cases above. A linkage update process retrieves the value stored in the LocalizationMethod column when updating copy links on records. In one embodiment, for each column, if LocalizationMethod has a value of 1 or 2, the linkage update process copies the column value verbatim from the master object to the slave object. If LocalizationMethod has a value of 3 or 4, the column is ignored and not modified by the linkage update process.

A translation process retrieves the value stored in the LocalizationMethod column when presenting the translation user interface and when saving translations. Columns with a LocalizationMethod value of 2 are presented to translators, and the text entered by the translator is saved into the target record. Columns with a LocalizationMethod value of 1 are not presented to translators, yet copied verbatim into the slave record as soon as any translation is saved. Other columns, for example columns with a LocalizationMethod value of 3 or 4, are ignored and not modified by the translation process.

The Create Slave function retrieves the value stored in the LocalizationMethod column when creating new slave objects based on existing master objects. In one embodiment, for each column, if LocalizationMethod has a value of 1 or 2, the Create Slave function copies the column value verbatim from the master object to the slave object. If LocalizationMethod has a value of 3, the Create Slave function initializes the column value by calling the GET_NEXT_ID function in the content management system. If LocalizationMethod has a value of 4, the Create Slave function initializes the column value using the target language specified in the Translate Link Table.

Seen Masters

In an embodiment, a history of content items which have been processed by the Notice Linkage function is used for reference for creating and updating content links by the Notice Linkage function. Preferably, the history is created and stored in a Seen Masters database table that stores identifiers of objects that have been processed by the Notice Linkage function. The Seen Masters table is used by the Notice Linkage function.

Supporting Function Library

In one embodiment, Linkage Module 300 is coupled to or integrated with a plurality of linkage support functions 14. Preferably, linkage support functions 14 are implemented in the form of a library of user-level functions. Linkage support functions 14 include inline code that can detect the language of a current page of a Web site and insert appropriate HTTP-EQUIV commands to specify the character encoding to the receiver of the page. The language detection code remembers its findings and uses this information in its library routines. This avoids cluttering function calls with additional parameters later in the page.

To facilitate templates that refer to other content objects by content ID, by management ID, by asset ID, by path, or by database key, a Follow Links function is provided. The Follow Links function receives an identifying attribute of an original content object and returns the same identifying attribute of a corresponding target content object, which the function attempts to locate by following links of specified type(s).

Linkage support functions 14 may comprise a wrapper function IDFOLLOW that is a wrapper for a function FOLLOW. IDFOLLOW receives as a parameter a pathname to a source content object, and returns a pathname for a localized version of the content using the linkage tables. All links, including links to static files (e.g., GIF files), templates, and components, are enclosed in a call to IDFOLLOW. For finer control, the FOLLOW function may be used directly instead. Preferably, relative path references are not used, and full pathnames are used. For example:

<IMG SRC="image.gif">⇒<IMG SRC="[IDFOLLOW "/path1/path2/image.gif"]">

<A HREF="file.asp">⇒<A HREF="[CURL [IDFOLLOW "/path/file"]]">

Links to other sites or servers can remain unchanged.

In an embodiment, the function follows by path, template ID, or management ID, returning the same. The master and language are specified by named and positional arguments. The names are "-path", which identifies a virtual path for templates and files; "-index", which identifies a path (nth) of a template to return and defaults to 0; "-templateid", which identifies an internal numerical id of the template ("database key" in the details box); "-mgmtid", which is a management identifier; "-lang", which specifies a language.

After the named arguments are removed, if none of -path, -templateid, and -mgmtid have been specified, the first remaining argument is the -path and the second is the -lang; otherwise the first is the -lang. This allows a two argument call for the common case of following by path. An error is raised if the target is not found.

Linkage support functions 14 may also comprise an Update Links function that updates a set of links, returning the number of links updated. The links to be updated can be specified by named and positional arguments. The named arguments are of the form "-name value", where value is a Tcl list. Multiple instances of -name concatenate the lists. The names may include "-master", which designates master object ids (instructing the Update Links function to update all links with the specified masters); "-slave", which designates slave ids (instructing the Update Links function to update all links with the specified slaves); "-project", which designates master projects (instructing the Update Links function to update all links with master objects in the specified projects); "-slave-project", which designates slave projects (instructing the Update Links function to update all links with slave objects in the specified projects); or "-label", which indicates link labels (instructing the Update Links function to update all links with the specified labels).

In operation, the Update Links function first removes the named arguments. Next, the first remaining argument is added to the -master list and the second is added to the -slave list. This allows a one or two argument call for the common cases of updating all links from a single master and updating a single master/slave link. The lists are combined logically as follows:

(-master OR (-project AND -slave-project AND -label)) AND -slave

The value returned reflects the number of links found, whether or not anything needed to be done to update them, for example, copy links that were already up-to-date. It does not reflect the number of links found or updated during recursive calls to the Update Links function, for example, a call to copy links to update links on their slaves.

In one embodiment, the Update Links function operates in connection with links that are each defined by four principal values: a link type, which may be "copy" or "translate"; a master management identifier, which specifies the resource that is the master of the link; a slave management identifier, which specifies the resources that is the slave of the link; and a details identifier, which is a handle to additional details about the link, and whose interpretation is dependent upon the link type. A link also may have a string label.

Further, in the preferred embodiment, each link also has a state value ("dirty bit"). The dirty bit is either set or unset. If the dirty bit is set, it indicates that the link needs to be updated, regardless of any other criteria that are used to determine whether it needs to be updated.

Multiple links may be updated in a single batch update. The set of links to update can be specified in several ways. One is by specifying the master resources of the links. Another is by specifying the slave resources of the links. Master and slave resources are specified by management identifiers. Another is by specifying the projects in which the master resources of the links are contained. Another is by specifying the projects in which the slave resources of the links are contained. Projects may specified by management identifiers, object identifiers, or project names. A recursive option may be chosen, which includes in a project the resources in subprojects, and so on recursively. Still another is by specifying the labels of the links.

If more than one of these five specifying methods is given, then the intersection of the sets of links obtained from each method is used. Once the set of links to be updated is determined, the links are updated one by one.

The process of updating a link is set forth below. In this context, the term "stop" means to terminate the process of updating this link immediately, and continue to the next link; and "ensure" P means that if P is not true, stop.

If the link type is "copy",
1. get handles to the master and slave resources from the content management server.
2. Look up the resource type of both, and ensure that they are of identical types. Recognized types are "Template", "Record", and "File". Ensure that the resources are of one of these three types.
3. If they are Templates, get the content of the master resource, which is a single string.
   a. If the dirty bit is not set, get the content of the slave resource, and if the slave resource is identical to the master resource, stop.
   b. Set the content of the slave resource to the content of the master resource.
4. If they are Records, get the table name of the master resource and look up the data configuration table entry for that table.
   a. From that entry, select the columns that have localization method 1 or 2, representing copy or translate columns.
   b. Look up the master resource in the database and retrieve the data from these columns.
   c. If the dirty bit is not set, look up the slave resource and retrieve the data from the same columns, and if all of the data are identical to the master data, column by column, stop.
   d. Set the data in these columns of the slave resource to the data of the master resource, column by column.
5. If they are Files, get the content of the master resource, which is a single string.
   a. If the dirty bit is not set, get the contents of the slave resource, and if the slave resource is identical to the master resource, stop.
   b. Set the content of the slave resources to the content of the master resource.

This completes the process of updating a copy link.
If the link type is "translate",
6. Look up the translation linkage table entry keyed by the details identifier of the link.
7. Retrieve the source language, source encoding, target language, target encoding, and workflow sequence identifier from this entry.
8. Set the object variables of the slave resource to the source language, source encoding, target language, target encoding, and master resource management identifier. "Object variables" are metadata describing how a resource should be localized. They are stored in a database table called the metadata table (not with the resource they refer to) keyed by the management identifier of the resource.

9. If the workflow sequence identifier obtained above is NULL, stop.
10. Look up the entries in the workflow sequence table keyed by the workflow sequence identifier. Each entry is a workflow step, containing a descriptive name and the username of the person to whom it should be assigned, and the order of the steps is specified in the workflow sequence table.
11. Get a handle to the slave resource from the content management server.
12. Consider the workflow steps in order. For each step, create a workflow step data structure understood by the underlying workflow system from the descriptive name and username, and add this data structure to the end of the list of workflow steps of the slave resource.

This complete the process of updating a translate link.

Linkage support functions 14 may also comprise a Follow Link function that receives, as a parameter, an identification of a master language, and returns a localized content item for the given language. In an embodiment, the Follow Link function assumes that the target is reached via two links, the second of which is a translate link. An error is raised if the target is not found.

Linkage support functions 14 may also comprise an Add Workflow to Content function that adds a sequence of workflow steps to a content item. It receives a list of tasks as a parameter. Each of the tasks is a lists of the elements {Name Type What Who} for user tasks, or {Name Type What InvocationPattern} for program tasks.

Linkage support functions 14 may also comprise a Create Proto Link function. Its arguments are the data needed to create a table row in the database for a new Proto Link. The arguments preferably comprise a Master Project ID value, Slave Project ID value, Link Type value, Label value, and Arbitrary String value. The project ID values identify existing projects. The Link Type value is a string that is either exactly "copy", or equal to the unique Comments field of a record in the Translate Link Table. The Label field is a string used for User identification of links, and the Arbitrary String value can be used to customize object creation.

The Create Proto Link function inserts the Master Project ID value, Slave Project ID value, Proto Link Type value, Label value, and Arbitrary String value as a new row into the proto links Table. If the Proto Link already exists, an error is raised. The Create Proto Link function is invoked from the Linkage Module user interface.

Adding an object link is analogous to creating a proto link.

Linkage support functions 14 may also comprise a Notice Linkage function which receives a Master Project identifier as a parameter. In order to insure that the database 10 stores accurate information about all linkages at any given time, the Notice Linkage function will notice or discover the current Linkage state and appropriately update state information according to defined proto links. The function searches the content items of the given project for items that are not in the Seen Masters table. If and when a new content item is found, the proto links that specify as their master project the project which includes the new content item is consulted. If such proto links exist, a Create Slaves From Proto Links function is called, as described further below.

The content item then is added to the Seen Masters table. If no such proto link exists for the project which contains the new content item, then nothing is added to the Seen Masters table. Thus, new items with no Proto Linkage remain new items, and subsequent invocations of the Notice Linkage function will continue to test such items for Proto Linkage.

Linkage support functions 14 may also comprise a Create Slaves From proto links function, and carries out creation of new slave objects based on proto linkage. Given a master object ID as a parameter, new slave objects corresponding to the object with the given master object ID can be created in each of the Slave Projects referred to in the Proto Linkage for the Project that contains the object with the given master object ID. Given a Master Project ID and Slave Project ID as parameters, new slave objects corresponding to all existing objects in the project with the given Master Project ID are created in the given Slave Project only, not Slave Projects described by other proto links.

Figure 4E:
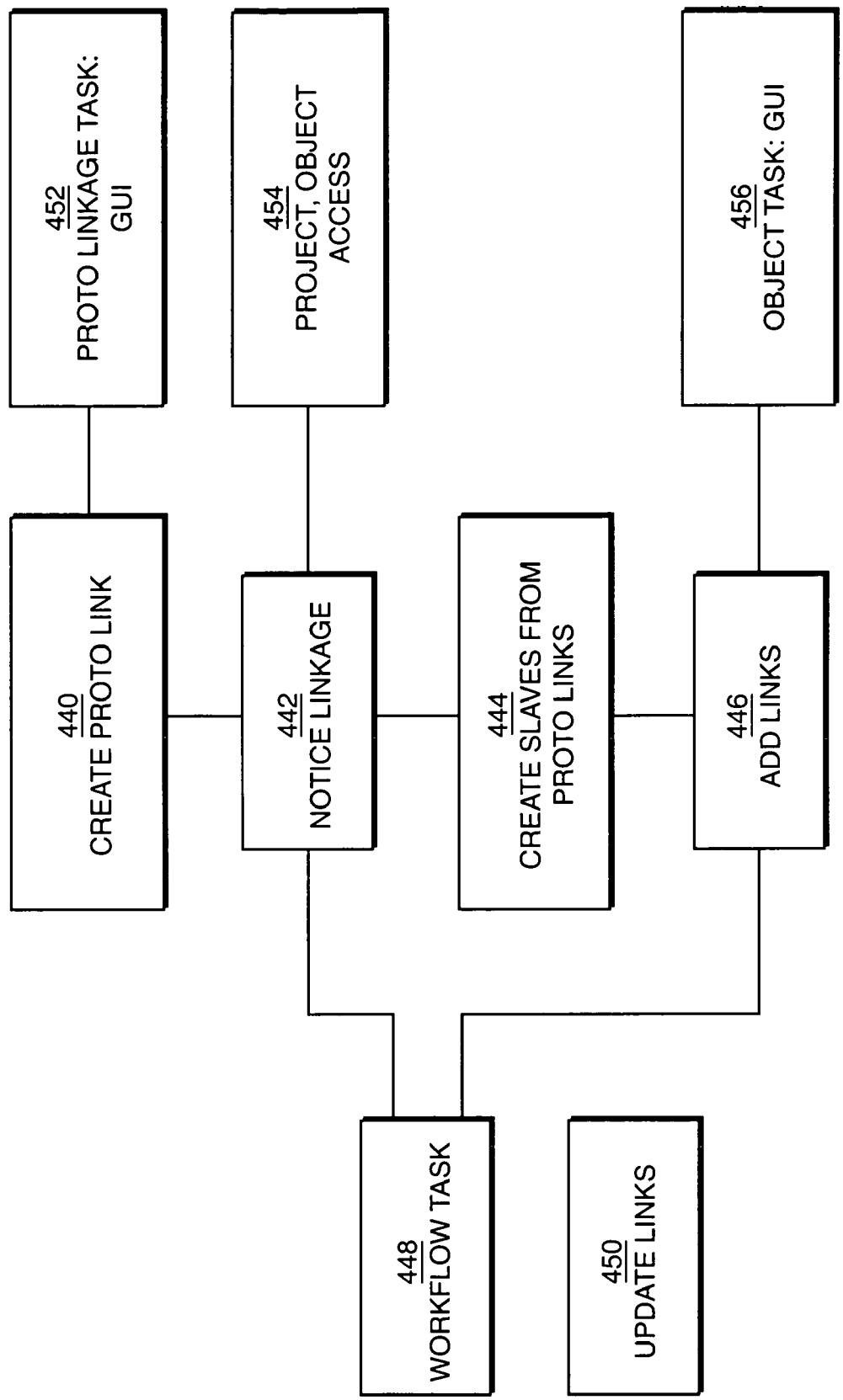
FIG. 4E is a flow diagram of a preferred process of creating proto links.

FIG. 4E is a flow diagram of a process of creating and using proto links. In block 440, the Create Proto Link function is called and one or more proto links are created. Block 440 may involve calling the Create Proto Link function by the workflow or by accessing an object or process through a graphical user interface, as indicated by block 452.

In block 442, the Notice Linkage function is called. Thereafter, a loop is entered. If there are any new objects in the Master Project, for example, if there are objects that are not in the Seen Masters table, then for each new object, one or more slave objects are created. As indicated by block 444, the single-argument form of the Create Slaves From proto links function is called by the Notice Linkage function for all new objects in the Master project. The two argument form is called by the Create Proto Link function and facilitates the retroactive creation of new slave objects corresponding to existing master objects that reside in a project that is the master project specified by a newly created proto link. Alternatively, slave objects may be created manually. As a result, the process retroactively creates new slaves for old master objects.

In block 446, the Add Links function is called, which causes the new proto link information to be added to the database.

In block 450, the Update Links function is called. As indicated by block 448, the Update Links function may be invoked using a workflow.

Block 452, block 454, and block 456 indicate entry points for the process. Block 454 a indicates that the Notice Linkage step of block 442 may be entered, alternatively, as a result of accessing a project or an object. The Add Links step of block 446 may be invoked from an object task or through the graphical user interface.

Depending on the type of the content item, e.g., template, record, file, and specific implementation parameters, e.g., naming conventions, data configuration, database tables, etc., the creation of a slave object from a master object may vary. Flexibility is built into linkage in the form of the Arbitrary String parameter, which is supplied in the creation of the Proto Link. The user interface provides a label for the arbitrary string, which is stored in a Create Code database table. Each Arbitrary String value is a Tcl list of two strings and one Tcl list, which may be empty. The first string is the name of a Library Template of the content management system 8 in which a procedure, whose name is the second string, resides. The third element of the list is a list of arguments which are passed as arguments to the procedure.

The Arbitrary String concept provides an interface between a structured Proto Linkage API and a flexible method for naming and placing new content items. This linkage interface provides the Arbitrary Procedure (specified by the first and second members of the Arbitrary String list parameter) with the necessary information to create new objects. When the newly created slave object ID is returned by the Arbitrary Procedure, a new link will be added to the Linkage Table. The Create Slaves From proto links function extracts the appropriate information from the Arbitrary String and stores it in the Slave object.

Linkage support functions 14 may also comprise a Create Slave function that provides a default mechanism for creating new slave objects from existing master objects. Accordingly, a default Arbitrary String that stores the name of a Create Slave function may be created and stored.

Linkage support functions 14 may also comprise an Add Links function that can add object links. The Add Links function accepts Object ID values for Masters and Slave objects, as in the Notice Linkage function. Additionally, it receives the other link parameters as specified in the database. A Type parameter specifies the type of link, and a Label parameter type is used to identify the link.

Creating Links

Figure 4F:
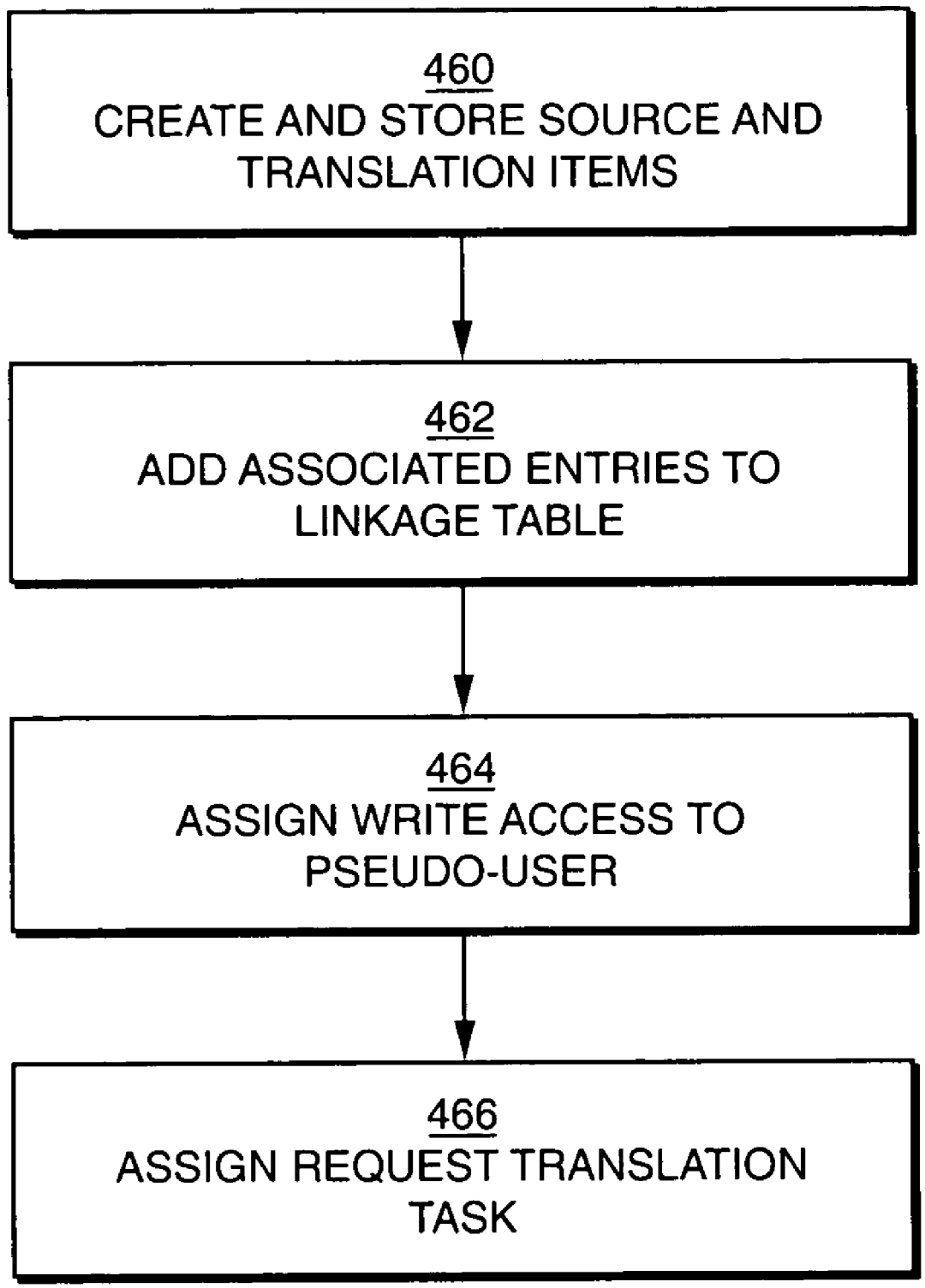
FIG. 4F is a flow diagram of a process of creating and updating links.

FIG. 4F is a flow diagram of a process of creating and updating links using a system having the foregoing configuration. In one embodiment, the steps of FIG. 4F implement the functions of block 428 of FIG. 4C.

In block 460, source and translation items, such as templates, records, or files, are created and stored. Such objects need not be stored in special projects, however, it may be convenient to create source and translation projects. Assume for the purposes of illustrating an example the management identifiers of the original, source, and translation items are /ci/123, /ci/abc, and /ci/def, respectively.

In block 462, associated entries are added to the Linkage Table. For example, the SQL statements listed below may accomplish addition of records.

insert into IdiomLinkageT (MasterID, SlaveID, LinkType) values
        ('/ci/123', '/ci/abc', 'copy');
    insert into IdiomLinkageT (MasterID, SlaveID, LinkType, LinkDetailsID) values
        ('/ci/abc', '/ci/def', 'translate', 1);

In an embodiment, the LinkDetailsID value of 1 may stand for translate into Japanese with the translator being Shinji and the validator being Hiroki, etc.

In block 464, the pseudo-user idiom is given write access to the source and translation items. In an embodiment, idiom is added to the owners list of the projects containing these items.

In block 466, a "request translation" task on the original item is assigned to the idiom pseudo-user. In response, the task starts and finishes automatically in the content management system. As a result, the content of the original item is copied to the source item, and workflow tasks, for example "translate" and "validate" tasks, are assigned on the translation item. These tasks may be completed using a Web interface of the content management system. If the user does not wish to use the "request translation" task, then the Update Links process may be invoked directly.

Creating Project Links

In an embodiment, project links can be created using an Add proto links form. A project is selected as the master project by selecting a pull down menu captioned "Master Project is:". In response, the system displays a list of all projects with fully qualified paths with respect to the base project from which to choose. Similarly, a project is selected as the slave of the Project Link. A text label for the link is selected. The kind of Project Link is selected, using a drop down menu that provides a "Copy" option or the name of a string that was entered into the "Comments" field of the Translate Link table.

An arbitrary string for object creation is selected. The string tells the system where to look for code that specifies how and where to create new content items.

To make the new link persistent, an "Add" button is selected. In response, the Linkage Module 300 reads the selected Master Project and creates new slave objects for all its content items by following its existing Project Links. Next, Linkage Module 300 enters the information from the Create Links form into a row in the database. Linkage Module 300 creates new slave content items in the selected Slave Project and creates object links for every pair of Master and Slave content items.

Using a system having this configuration, a master Web site may be linked to a target translated Web site.

For example, a source Web site having English content may be linked to a version of the site in Japanese. Using the linkage methods and mechanisms described herein, the English version is connected to the Japanese version so that workflow tasks are automatically generated to handle translation tasks that arise when the English version is changed. In one specific embodiment, an English version of the site is stored in a first project. A second project serves as the source for the Japanese translation. There is a copy link from the original project to this source project. A third project stores the Japanese version of the site.

Each object in these projects, and their subprojects, is linked. The original project is copy-linked to the source project, which is translate-linked to the translation project. As a result, when a user modifies an object in the original project and finishes the last assigned task in the project (e.g., a Check by Creator/Modifier task), the original object is copied to the corresponding source object, and workflow tasks are created for the translated object. The translator is notified so that the translator will know that a revised translation is needed, and can then update the translated site.

Project links also connect the original project, source project, and translation project. Their subprojects are not proto linked. If a new content item is created in the original project, then corresponding linked source and translated objects will be created as well.

Process Of Use

A system having the foregoing configuration may be used to localize content items with the following process.

A content item to be localized has, in its associated workflow, and generally at the end of the workflow, a linkage initiation task that starts the linkage process. Preferably, the linkage initiation task is part of a default workflow that causes all content of that type within the project to be localized automatically whenever changes are made. The linkage initiation task is a user task, assigned to a pseudo-user, for example, pseudo-user "idiom." A combination of the name and description fields in the linkage initiation tasks indicates that links are to be updated when the task is run. In one embodiment, Tcl code in the description field indicates that links are to be updated when the task is run. The name of the linkage initiation task may be, for example, "request translation".

In one embodiment, when the linkage initiation task starts, it causes an email notification to be sent to the pseudo-user idiom's mailbox. The contents of the mailbox of pseudo-user idiom are monitored by a script or application program. When the notification message arrives, the script or application program starts the task, runs the Tcl code in the description, and finishes the task. This mechanism simulates the action of a natural person starting and finishing a task, and is used to circumvent certain known limitations of the content management system 8. Alternatively, the email notification mechanism is not used and the linkage initiation task starts, executes, and finishes automatically without such a mechanism.

The Tcl code in the description of "request translation" tasks calls the Link Update function for the content item. In response, the Link Update function retrieves from database 10 all of the slave items that are linked to with the content item specified to be the master object, and updates all such links. Usually, these links all are copy links, and the slaves of the links are called "source items." As described in more detail above, updating a copy link involves copying the content of the original item into the source item, and calling the Link Update function for the source item.

All of the links from the source items are usually translate links, and their the slave objects are called "target items." As described in more detail above, updating a translate link involves adding workflow tasks to the target item that cause it to be translated or localized from its source item. Specifically, up to two steps may be added: a translate user task assigned to a translator, and a validate user task assigned to a validator. Usually, these will be the only tasks in the workflow, since no other process is supposed to be playing with the item, unless of course a previous incomplete translation task or validation task exists. Information identifying which steps are added and to whom they are assigned are properties of the translate link and are stored with it in the database.

Each translate task and validate task is associated with or contains information that indicates details about the localization, including the source item, source language and source character encoding, target language and target character encoding.

When the translate task or the validate task starts, it causes an email notification to be sent to the account of the person who is acting as translator or validator. That person logs into the workflow interface. The workflow interface finds all tasks assigned to that person and extracts the details from the description fields of the tasks. When a translator or validator claims the job, the workflow interface starts the task. When the translator or validator enters or modifies the translation, the workflow interface puts the translation into the target item. When the translator or validator finishes work, the workflow interface finishes the task, and the workflow continues. The workflow interface handles workflow updates if the validator needs to send the item back to the translator, or carry out other actions.

Figure 2C:
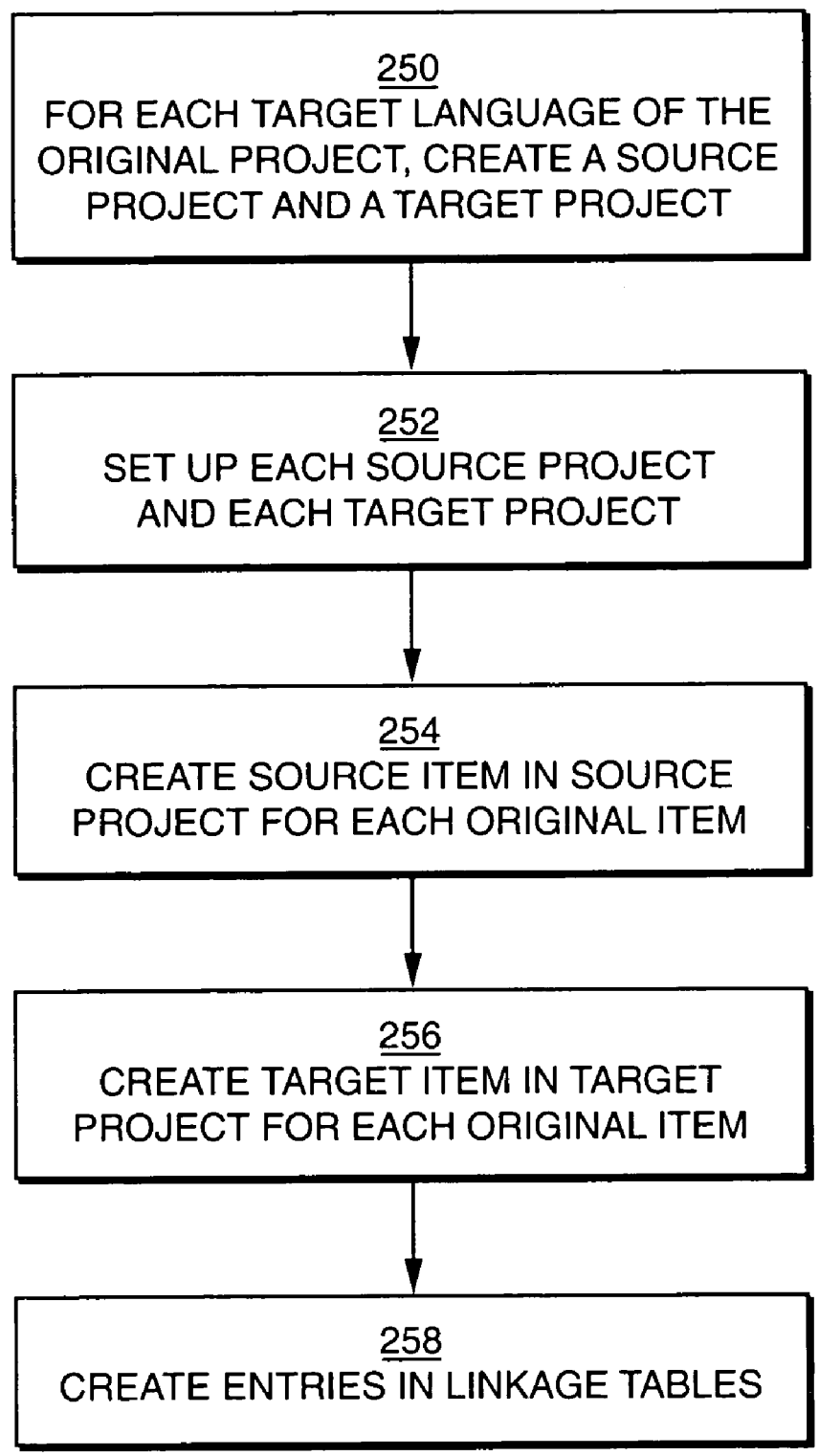
FIG. 2C is a flow diagram of an embodiment of establishing a linkage mechanism.

FIG. 2C is a flow diagram of an embodiment of establishing a linkage mechanism. In block 250, for each target language of an original project, a source project and a target project are created. The names of the source project and target project reflect the type of project and the language with which they are associated. The original project is assumed to be pre-existing and to have original content items in it. In the default workflow for the original project, the tasks "create links" and "request translation" are assigned to the pseudo-user "idiom" as the first and second tasks in the workflow. Placing these tasks in the workflow enables Linkage Module 300 to properly identify new content for translation in the project.

Generally, for project templates, the first task is "Check by Creator/Modifier," and "create links" and "request translation" as the second and third tasks, respectively. Retaining a first task in the workflow prevents a translation request from occurring every time a template is created or modified. In this configuration, "create links" will not run until after the "Check by Creator/Modifier" task has finished, and therefore no new slave object will be made according to Proto Linkage.

In the new project for the source content items, the default workflow includes as its first task the task "create links" to the pseudo-user "idiom". In the new project for the target translations, no tasks are assigned to the user "idiom" but project ownership is assigned to "idiom". The translation project is also empty. As indicated in block 252, each source project and each target project is set up with all workflows empty, auto-launch, auto-version, and no final review.

In block 254, a source item is created in the appropriate source project for each original item. In block 256, a target item is created in the appropriate target project for each original item. In block 258, all relevant entries in the linkage tables are created. Block 254, block 256, and block 258 involve creating and storing information that defines details of translation and workflow need to be defined. In an embodiment, this is done by manually manipulating the Translation Link database table and the Workflow Sequence database table.

FIG. 4A is a flow diagram of an alternate embodiment of a process of establishing linked projects. In block 400, an original project having original content is created. In block 402, the tasks "create links" and "request translation" are assigned to the pseudo-user "idiom." In block 404, a project is created for the source content items. In block 406, a task named "create links" to pseudo-user "idiom" is assigned in the default workflow. In block 408, a new empty project of pseudo-user "idiom" is created for each of the target translations. In block 410, a new empty translation project is created, which is owned by "idiom."

Referring now to FIG. 4B, in block 412, translation and workflow details are defined. In one embodiment, block 412 involves creating and storing entries in rows of the tables of FIG. 5A and FIG. 5B. In block 414, one or more project links are added to the projects that were previously created. For example, a master project and a slave project are chosen, as indicated by block 416. In block 418, a link label and a value for the type of project link are chosen. In block 420, an object creation mechanism is selected.

FIG. 4C illustrates a process of automatically creating objects. In block 422, new slave objects are created for all content items of the master project, by following existing project links. In block 424, the previously selected information is entered in the database. In block 426, new slave content items are created in the slave project according to the links. In block 428, object links are created for each pair of master and slave content items. In block 430, a history table is updated, for example, by updating the Seen Masters table with objects that have been handled in the preceding steps.

Advantages and Other Uses

In this configuration, linkages enable both central control, to ensure consistent updates and content, as well as local or autonomous control that permits some variance in translation and localization processes.

In some embodiments, users of linkage may have control over various elements that are affected by the linkage processes. For example, an overall administrator may have authority to create, modify or delete all linkage table values whereas a site manager may have authority to create, modify or delete only those linkage table values that correspond to a particular site.

It will be apparent from the foregoing description that the linkage structures and processes described above may be appropriately configured and used to carry out loose adaptation of sites and not for direct translation. Further, links may represent transformations of objects rather than copying one object to another.

User Interface

In the following description, the term "WorldServer for StoryServer" is used, for convenience, to refer to an embodiment of the invention that is specific to StoryServer.

Figure 3A:
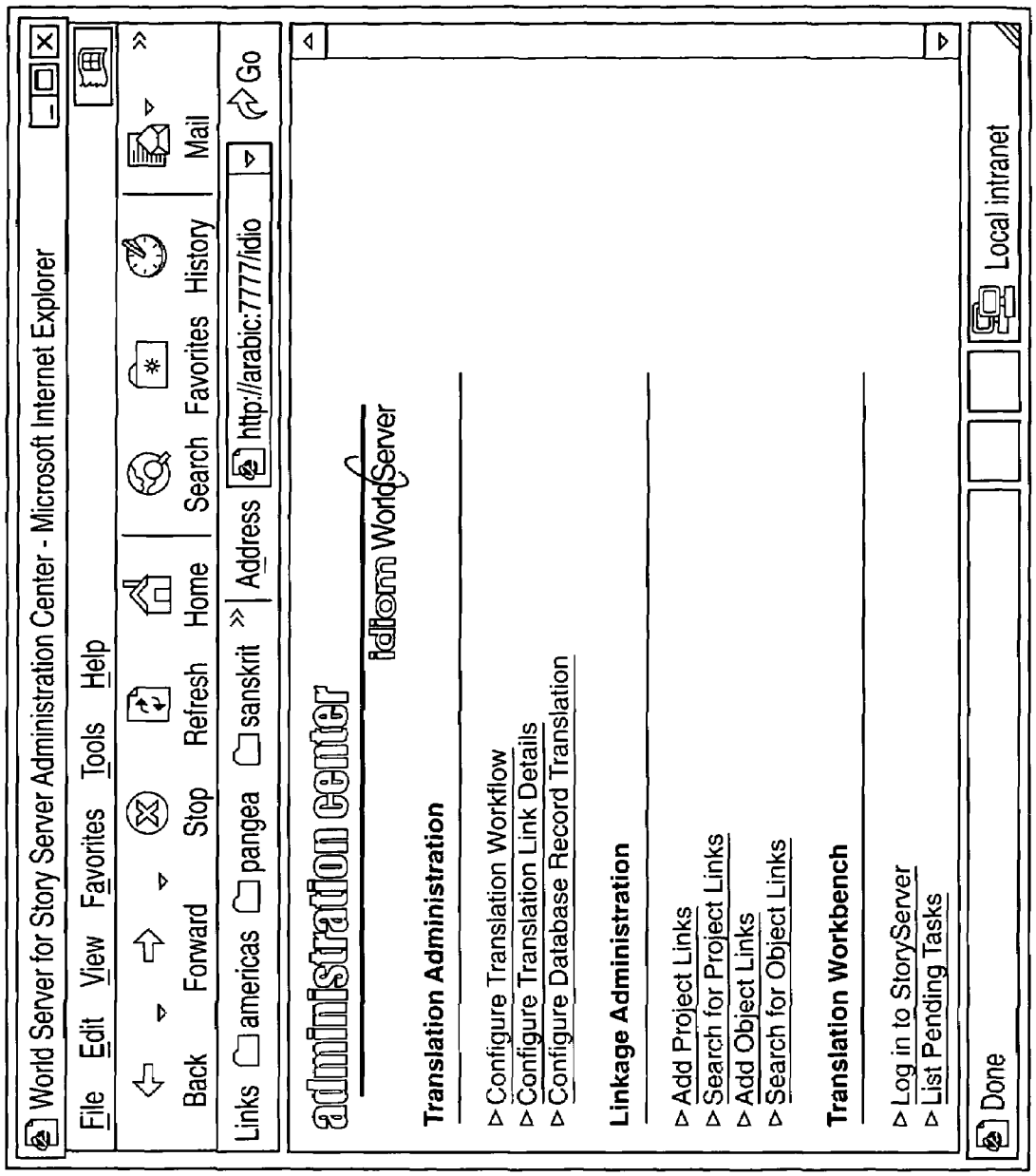
FIG. 3A is a diagram of a graphical user interface for selecting linkage administration tasks.

FIG. 3A is a screen shot of the WorldServer for StoryServer Administration Center. When accessing the Center at http://localhost:7777/idiomstart (where 'localhost' is the fully qualified domain name of the CAS you are using, and '7777' is the hypothetical port number on which Gushi is listening), you must be logged in as an administrator. If you are not, you will be directed to a page intended for users without administrative privileges. After logging in as a user with administrative privileges, you can return to the URL and refresh the page to see the Administration Center.

As an administrator, you will use this page to access useful database entry/edit forms. The Idiom database tables that these tools manipulate are essential to the globalization process.

Overseeing Translation—Overview

In order to set up the infrastructure for translation of StoryServer content using WorldServer, a few administrative details need to be set up. Given that you know the people that will be involved in the translation process, the type of translation to be done, and the content items or their parent projects to be translated, everything can be configured through WorldServer User Interfaces.

The order in which people will get involved in the translation, or Workflow Sequence is configured using the Translation Workflow interface. The type of translation that these people will do, or Translation Details is configured Translation Link details interface. Record data is configured using the Data Configuration interface. Content relationships are configured based on the above information using the Linkage interfaces (described in Linkage Administration).

You may configure the system for several translation types employing different people to automatically detect changes and spawn workflow for content items in your StoryServer web site.

Configure Translation Workflow

WorldServer requires certain database information to initiate workflow on content items to be translated. The following section describes both the process of adding and editing this information using WorldServer's Web interface. Administrators can use this interface to view the existing translation workflows available in WorldServer, to add new steps to existing workflows, and to create entirely new workflows.

Go to the WorldServer for StoryServer Administration Center at http://localhost/idiomstart as shown in FIG. 3A. Choose the Configure Translation Workflow link. The Add Workflow Step page is now displayed. The fields to be entered into the form are described as follows. The identifier in parentheses correspond to the column name in the database table. Workflow Sequence ID: a unique integer in the Workflow Sequence Table (WorkflowSeqID) referenced by the Translate Link Table. Step: an integer in the IdiomWorkflowT (SeqNo) identifying the step's order for the workflow. Name of Task: name of the workflow task (Name) Person: person to perform task (Who) Description: optional description of the task (What). Below is a brief example of entries in a Workflow Sequence Table:

| Workflowseqid | seqno | name | who | what |
| --- | --- | --- | --- | --- |
| 1 | 1 | translate | shankar | Translate to Spanish |
| 2 | 1 | translate | shinji | Translate to Japanese |
| 2 | 2 | validate | hiroki | <NULL> |
| 3 | 1 | translate | russross | Translate to French |
| 4 | 1 | translate | sethr | Translate to German |
| 4 | 2 | validate | sriney | Validate German |
| 5 | 1 | translate | HopTransGroup | Translate hopper site |
| 5 | 2 | validate | akira | Validate hopper site |

Configure Translation Link Details

For translation steps, the type of translation needs to be specified within WorldServer. These types have details associated with them such as source and target languages, character encodings, etc. In order for translation to occur, the details associated with that transformation must be defined. The Configure Translation Link Details interface provides that functionality.

From the WorldServer Administration Center, follow the Configure Translation Link Details link. You will be directed to a form titled Add Translation Type.

The Add Translation Details interface provides an easy method of entering data into the WorldServer database table named Translate Link Table. The input fields are described as follows, where the abbreviations in parentheses apply to the example table below:

Source Language (slang): two letter abbreviation for language of source object (en for English, etc.)

Source Encoding (senc): The character encoding of SourceLanguage (integer, e.g. 1252)

Target Language (tlang): The two letter abbreviation for language of translated object (jp for Japanese, etc.).

Target Encoding (tenc): The character encoding of TargetLanguage (integer, e.g. 932)

Workflow Sequence ID (wid): An index into Workflow Sequence Table, described in previous section Comments (comments): A string (at most 255 characters long) used in the GUI which describes what kind of translation and workflow is associated with the entry into the table. There is no constraint on the value of this string; however, to prevent potential problems, great effort should be made to avoid having the EXACT same string in the comments field of more than one translation type.

Below is a list of possible rows in the Translate Link Table.

| id | slang | senc | tlang | tenc | wid | comments |
| --- | --- | --- | --- | --- | --- | --- |
| 1 | en | 1252 | jp | 65001 | 2 | Translate to Japanese |
| 2 | en | 1252 | jp | 65001 | 5 | Translate to Japanese (Hopper) |
| 3 | en | 1252 | fr | 1252 | 3 | Translate to French |

-continued

| id | slang | senc | tlang | tenc | wid | comments |
|----|-------|------|-------|------|-----|----------|
| 4  | en    | 1252 | de    | 1252 | 4   | Translate to German |
| 5  | en    | 1252 | es    | 1252 | 1   | Translate to Spanish |

Configure Database Record Translation

From the WorldServer for StoryServer Administration Center, click on the Configure Database Record Translation link. To select an existing record table, click the down-arrow in the left-hand column and select it from the list that appears; then click on the Continue button. To enter a record table by hand, type its name into the text box in the right-hand column and press Enter from within that text box or click Continue.

This page shows each of the columns in the table of choice, as well as the information from the IDDataConfigT for each. If a column (or the whole table) is new, meaning it has never been configured, the fields will be blank. The fields are as follows:

Column Display: this is the text that a translator will see when translating records in the Translation Center (see Translation Interface)

Localization Method: this indicates how the record column will be translated. The possible values are:

Copy: columns containing content that you don't want translated, such as file names for images, proper names, addresses, etc.

Translate: columns that need to be translated.

Get next ID: column containing the record ID for the record. (Usually the primary key.)

Language: column containing the Language for the record row. Some record tables may not have this column.

MIMEType: the possible MiMETypes for content items in StoryServer. This is a list of all content from the IDMimeT. WorldServer for StoryServer ships with standard MIME Types.

Overseeing Linkage—Project Setup

Before the other functions of the Administration Center (Linkage Interfaces) can be illustrated, pertinent StoryServer projects need to be created and configured via the StoryServer Java Tools. StoryServer documentation provides information about changing project details and editing workflow.

Proto linkage automates the creation of slave content items and the linkage necessary for automated workflow to occur. Certain projects must exist before project links can be made for a given translation type. The original will act as a master for the source projects for each target language into which you wish to localize.

Figure 3B:
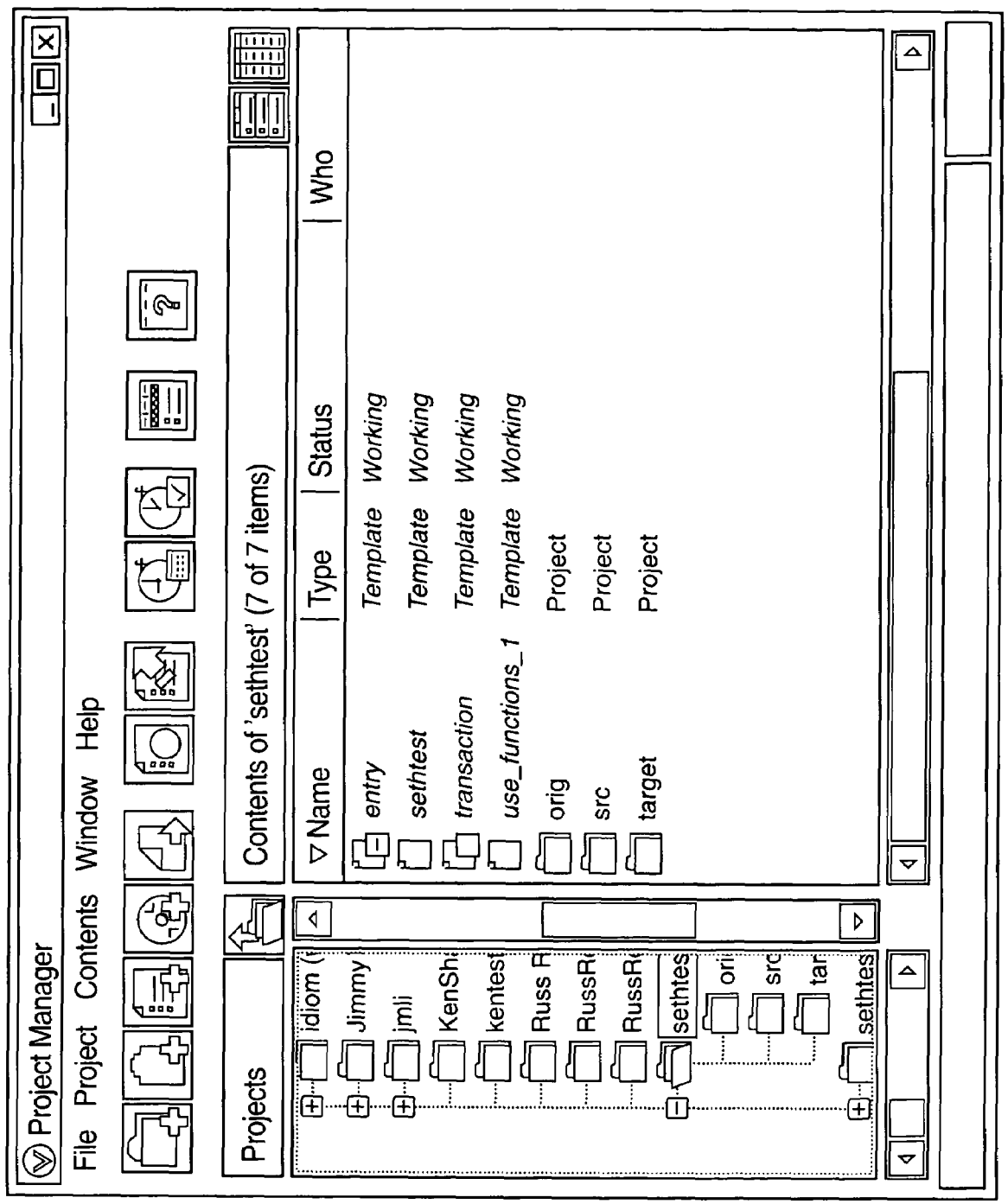
FIG. 3B is a diagram of a graphical user interface for selecting a project for linkage.

Referring now to FIG. 3B, first, the original project must exist with the original content items in it. In the default workflow for this project, the tasks create links and request translation need to be assigned to the user "idiom" as the first and second tasks in the workflow. These tasks are necessary for the email notification mechanism to properly identify new content for translation in the project.

For templates, it is recommended, to leave the first task as Check by Creator/Modifier, and add create links and request translation as the second and third tasks respectively. Without the first task in the workflow, a translation request would be made every time a template was created or modified. For new templates, it is desirable to finish developing the template before finishing and initiating translation workflow. Because create links will not run until after the Check by Creator/Modifier task has finished, no new slave object will be made according to proto linkage. However, you will NOT see source or target objects under project-linked projects until you finish the Check by Creator/Modifier task for the original.

Second, a new project for the source content items needs to be made through StoryServer. The default workflow for this project must include only as its first task create links to the user idiom. The project should be empty, and should be named appropriately.

Third, a new project for the target translations should be created. This project needs no default workflow. The translation project should also be empty and named appropriately.

Default Workflows

Here are the recommended default workflows for a standard sequence of projects:

| original project | source project | target project |
|------------------|----------------|----------------|
| Check by Creator/Modifier and create links and request translation | create links | (none) |

Naming Conventions

The linkage software automatically names sources by appending the string (label_source), not including either quotation mark, to the end of the originals' names. TRANSLATION content items are named by replacing the string (label_source) with (label). In both cases, label is the label for the project link, generally the two-letter country code the two letters that comprise the label for the project link.

For example, an original content item is named "index.html". The label for both copy and translate links is "jp". The source content item which is automatically created is named "index.html (jp_source)". The target content item is named "index.html (jp)".

Add Project Links

After this configuration is done, links between projects need to be added. Adding a project link for a translation causes two things to happen: source and target slaves are created for content items that already exist in the original project, appropriate links are added, and those links are updated (translation workflow is initiated for the target items). any new content items added will have source and target slaves added automatically, appropriate links added, and those links updated.

This enables you to take an existing original language project and link it with a project meant for the source and target items for a new language. All the new content items and links are created automatically, and the translators and validators for the desired language can begin translation tasks immediately.

Figure 3C:
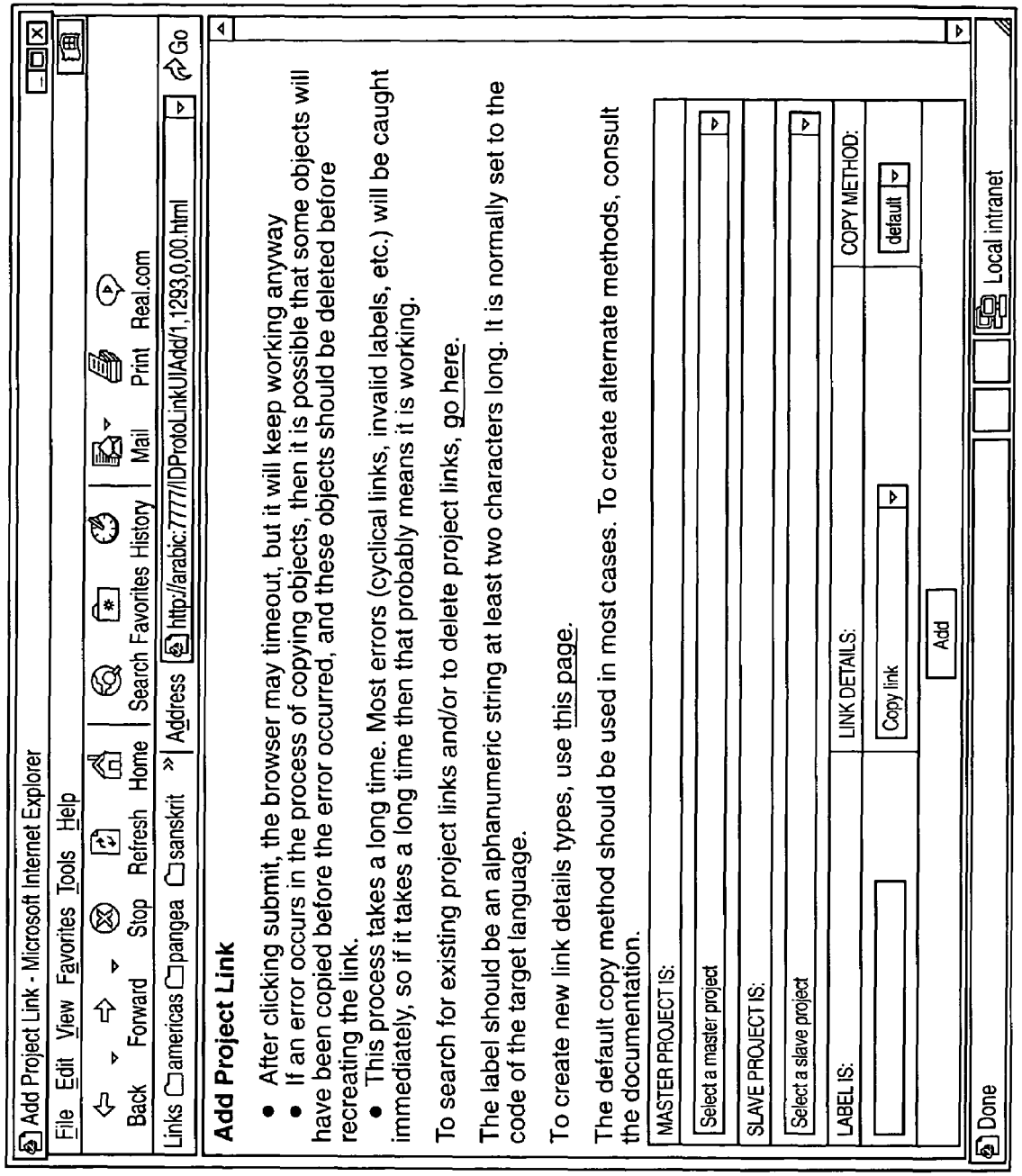
FIG. 3C is a diagram of a graphical user interface for adding a project link.

Referring now to FIG. 3C, in order to use the online interface to create project links, follow these steps:

Choose the desired master project from the pull down menu with the caption Master Project is:. A list of projects with fully qualified paths with respect to the base project from which to choose will be displayed. Then choose the project that is to be the slave of the Project Link. Note: circular links are explicitly guarded against, meaning there is no way to have a slave be the master of an item in its previous linkage.

Choose a label for your link, restricted to 2-8 alphanumeric characters. It is highly recommended, though not required, to make the label of copy and translate links for a given translation sequence the same, and equal to the 2 letter language abbreviation for the target.

Choose what kind of Project Link to be created. A string equal to either "Copy" or the string that was entered into the "Comments" field of the Translate Link Table is displayed under the caption Link Details.

Choose the copy method for object creation. The "default" string will cause code from a specific library and procedure to be invoked, using from the "Label is:" form field to name the new objects and links. If additional functionality is desired, please consult Idiom Professional Services about providing custom code for this process.

Note: the code used to create new content items preserves attributes of the originals. Paths for files and names are handled much the way content item names are. For a copy link, the path is prepended with the string "/label_source", where label is the source. For a translate link, the "/label_source" is replaced with "/label", the (usually 2 character) label for the link.

Search for Project Links

Figure 3D:
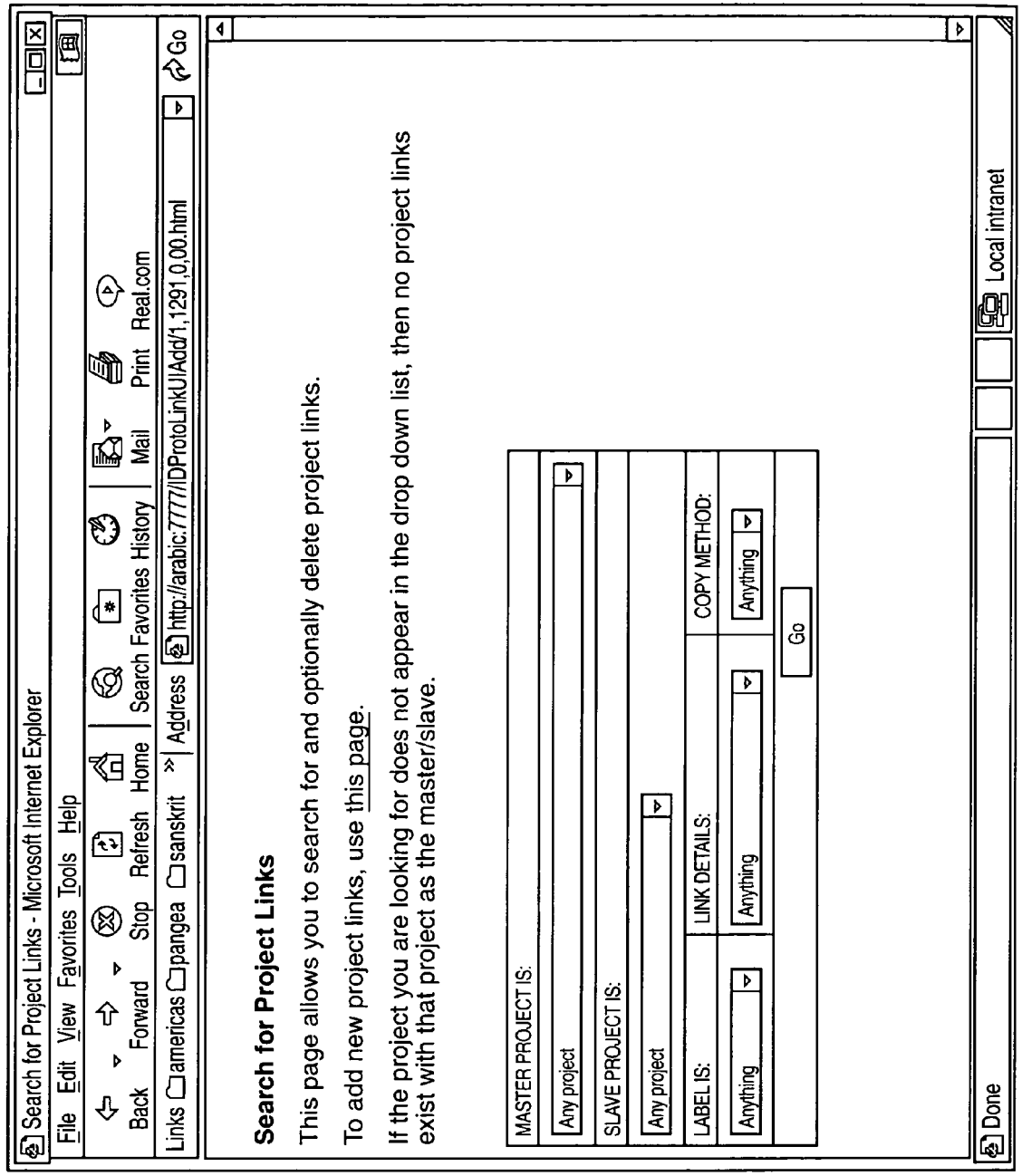
FIG. 3D is a diagram of a graphical user interface for searching for a project link.

Project links can be queried and deleted using another interface, also available from the Administration Center. Following the Search for Project Links link takes you to the page shown in FIG. 3D. From this screen, project links can be queried using different criteria, including master or slave projects, labels, link details, or copy method. The fields are described below:

Master Project Is: this identifies the fully qualified pathname (within StoryServer) of a project which may be linked to others as a master.

Slave Project Is: same as for the Master, except the project may be a slave.

Label Is: identifies a label with which to identify links. If the recommended labeling convention is used, this will be the 2 character language code.

Link Details: identifies the type of link to look for. Possible values are Anything, Copy, Any Translate Link, or the specific types defined in Configure Translation Details above.

Figure 3E:
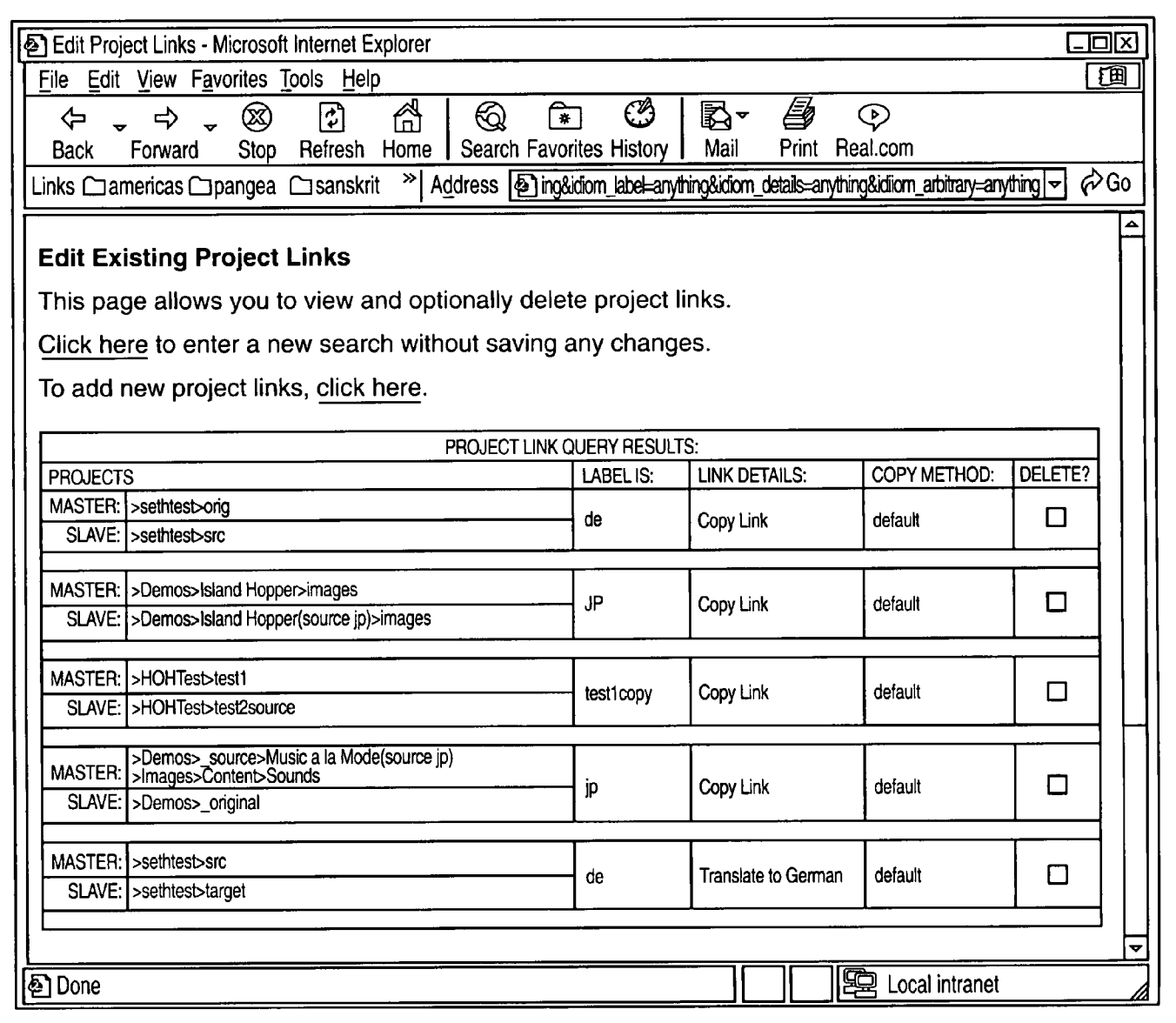

After clicking on the Go button, the appropriate query of the database is performed, and a screen as shown in FIG. 3E is generated. This page displays the project links that matched the criteria you entered in the "Search" form. From this page, you can return to the search page, go to the add project link page, or check boxes for links to delete and submit the form by clicking save.

Note: Deleting project links will only affect future content items added to the master project. Object links (see next section) remain for the content items left in the projects. Also, deleting the project link does not delete the content items that may have been automatically generated for the master items. If a project link is added again, and there are content items in the project, new slave items will be created. Therefore, it is possible for the slave project to contain two slave items which are linked to the original master. Be aware that this is not desired, and that if you create a project link and then immediately delete it for whatever reason, the new slave objects should also be deleted.

—Add Object Links

Figure 3F:
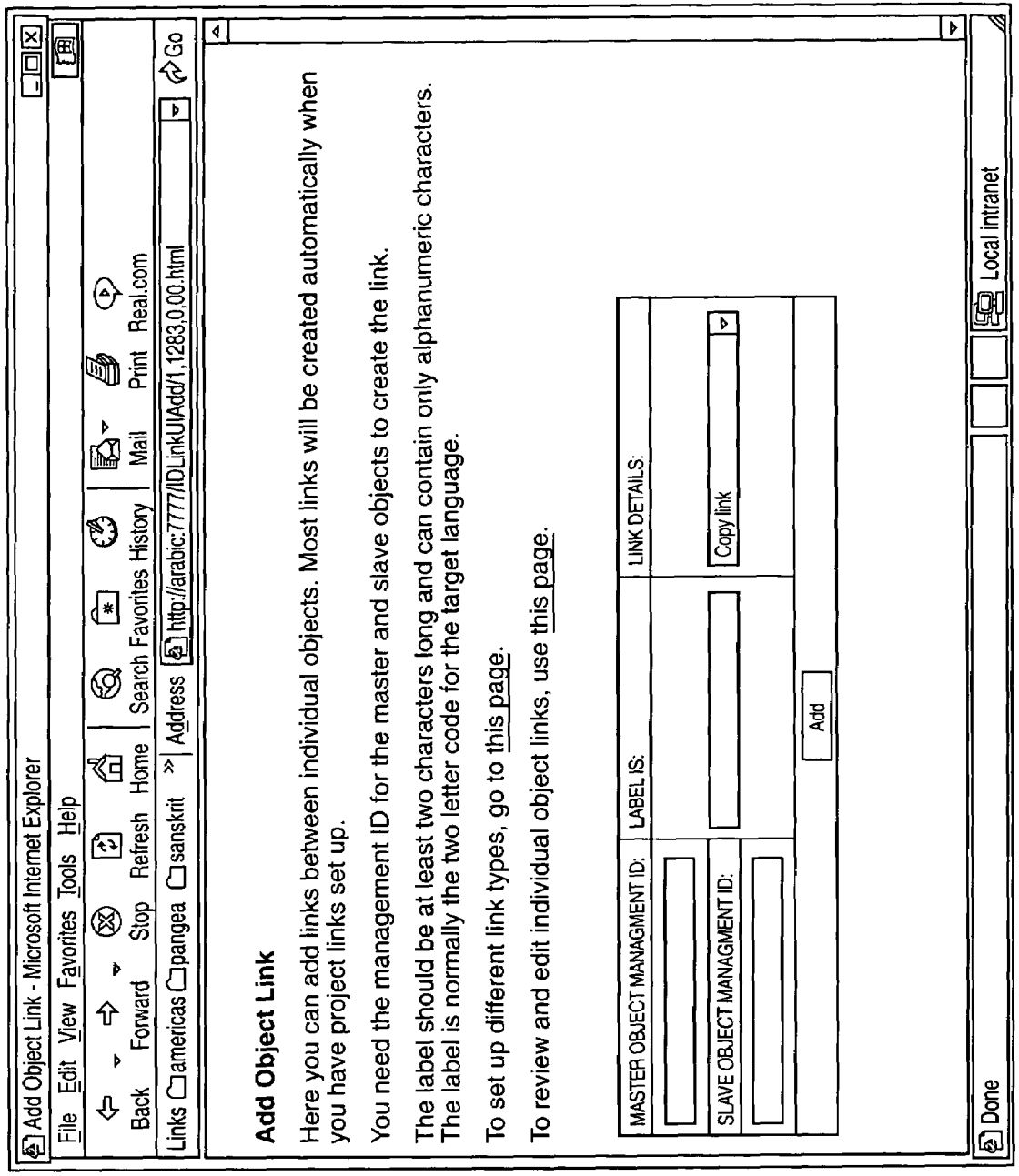
FIG. 3F is a diagram of a graphical user interface for adding an object link.

A single link can be added between two objects with known management ID's (see StoryServer documentation for a definition of management ID's). By clicking on the Add Object Links link in the Administration Center, the page shown in FIG. 3F will be loaded. From this screen, a new object link can be added. The following information needs to be supplied:

Master Object Management ID: obtained from details for the content item using the StoryServer Java tools Slave Object Management ID: obtained from details for the content item using the StoryServer Java tools Label Is: recommended to be the two letter language code for the language of the translation sequence.

Link Details: chosen from list of available details, i.e. all possible comments from the IDTransLinkDetailsT.

When the ADD button is selected, the methods and mechanisms described in this document are executed in order to add a link.

Figure 3G:
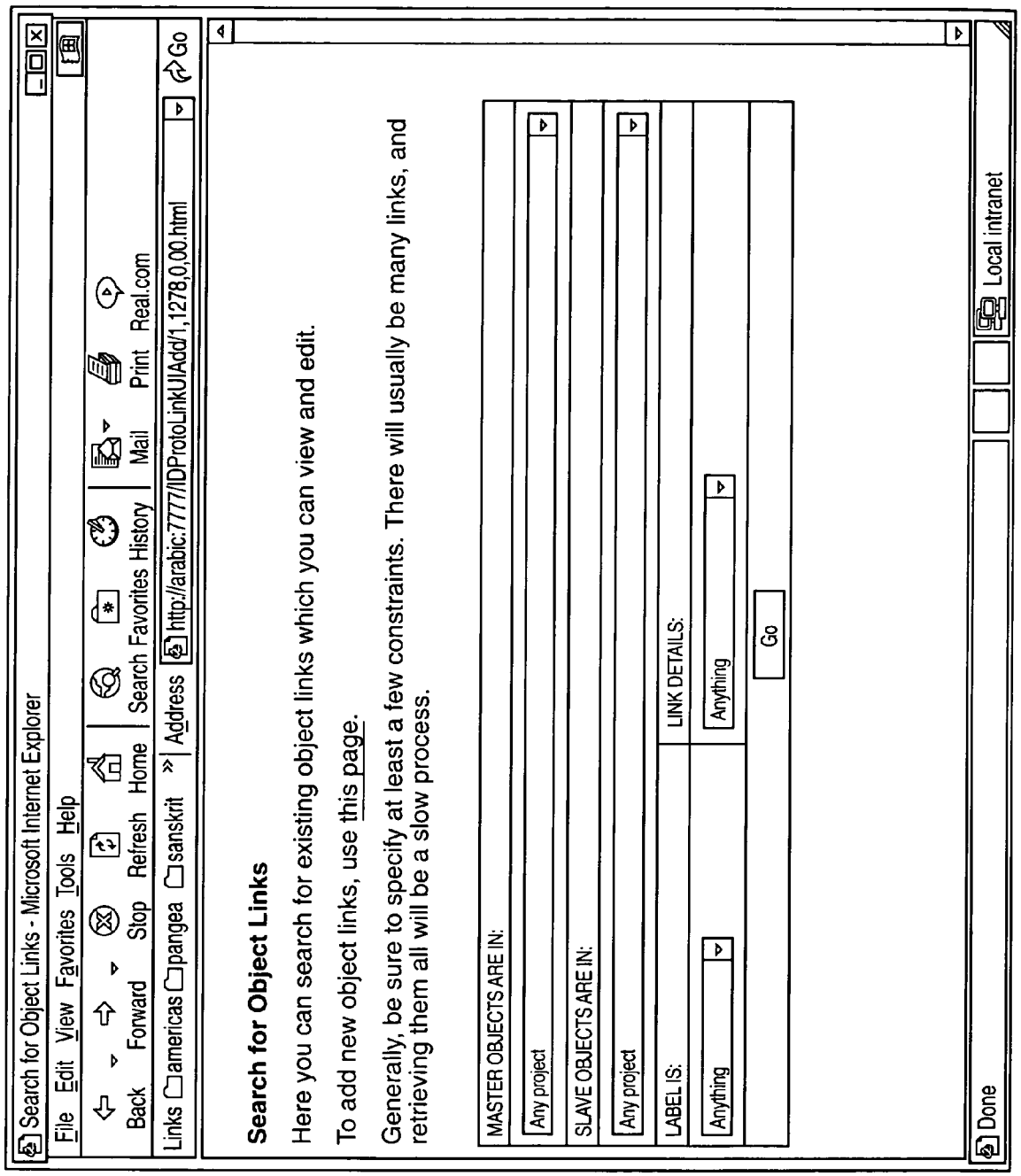
FIG. 3G is a diagram of a graphical user interface for searching for an object link.

Object links can also be queried similarly to the way project links are queried. By following the link marked by Search for Object Links in the Administration Center, the page of FIG. 3G is reached. Object links can be queried using values as constraints, which is performed from this screen. The fields to be queried on are as follows:

Master Objects Are In: this drop down box shows all the projects in the StoryServer base project Slave Objects Are In: same as above Label Is: identifies a label with which to identify links. If the recommended labeling convention is used, this will be the 2 character language code.

Link Details: identifies the type of link to look for. The only possible values are Anything, Copy, Any Translate Link, or the specific types defined in Configure Translation Details above.

Figure 3H:
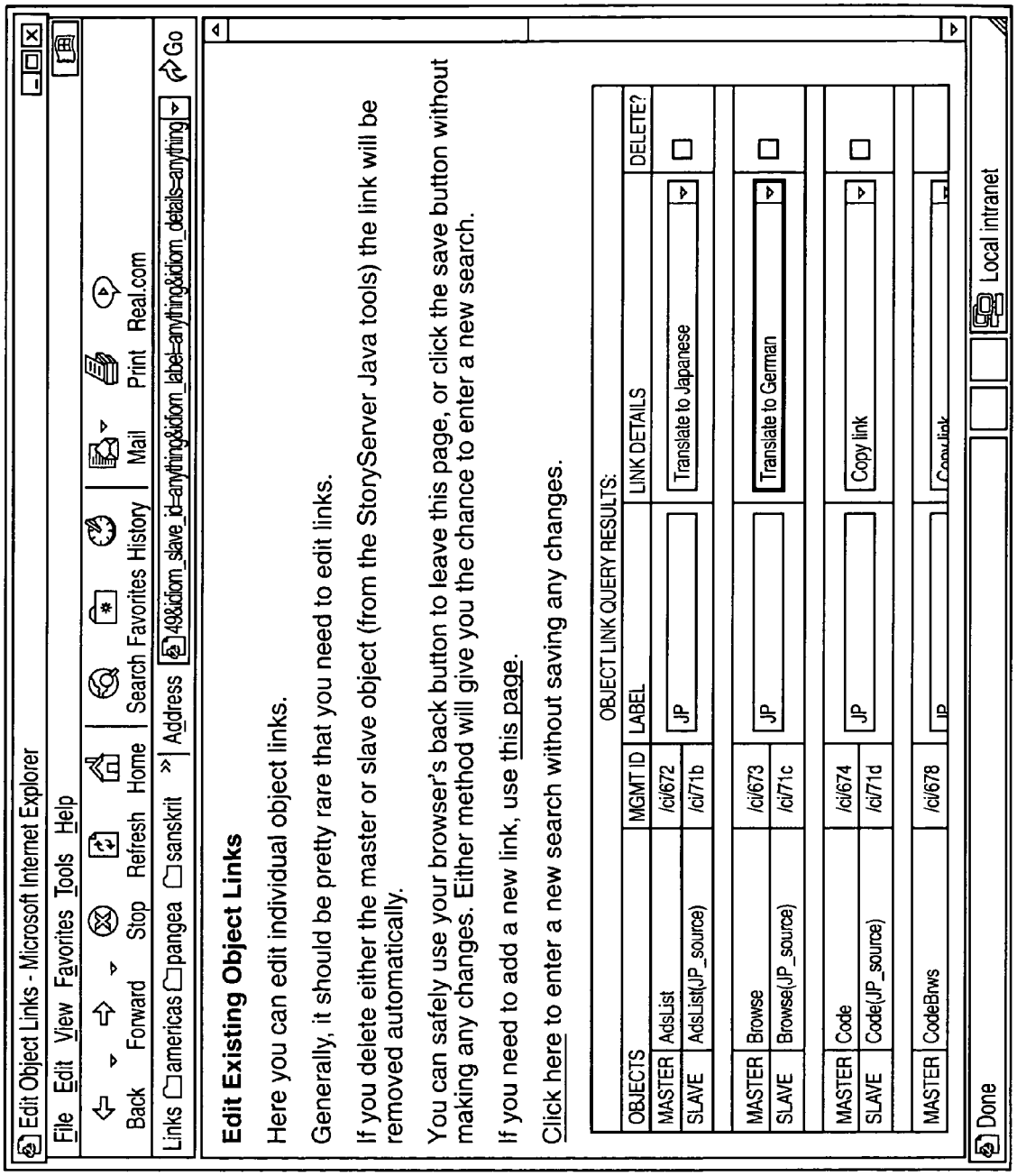
FIG. 3H is a diagram of a graphical user interface for editing an object link.

Clicking the Go button will bring up the screen shown in FIG. 3H. This form can be used to edit or delete the Label and Link Details. Caution should be taken when editing object links, as workflow in progress may be affected. Check that there are no translation workflow steps pending for items you are planning to change links to or from.

Hardware Overview

Figure 6:
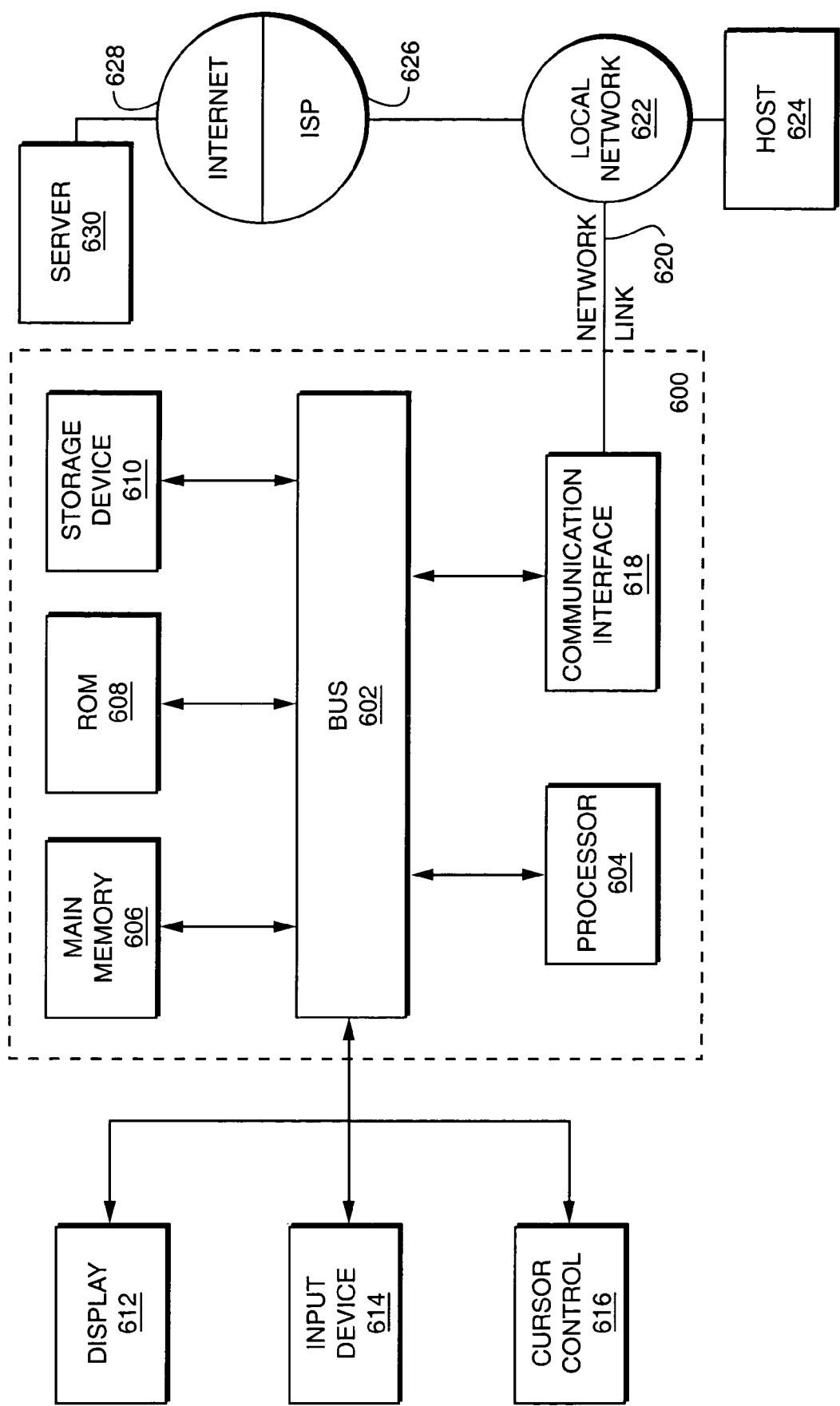
FIG. 6 is a block diagram of a computer system with which an embodiment may be used.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are implemented by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hardwired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector can receive the data carried in the infrared signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application implements the techniques described herein.

The received code may be executed by processor 604 as it is received, and/or stored in storage device 610, or other non-volatile storage for later execution. In this manner, computer system 600 may obtain application code in the form of a carrier wave.

Another exemplary embodiment of the present invention is the WorldServer application. WorldServer is a powerful web-based application that enables enterprises to manage their content in the context of the whole globalization process while leveraging established web architecture, content management, and workflow systems. WorldServer simplifies the multiple complexities arising from deploying a global Web strategy, enabling a company's Web site to efficiently support not only multiple countries but also different languages, locations and cultures. It also provides structure and process to the collaborations among site managers, web developers, content owners, translators, and editors, resulting in a streamlined process, a synchronized global web strategy, and a coordinated global Web team. WorldServer features a concept called "Linkage." Linkage lets you establish business rules that strike the balance required between centralized control of content that enforces a strong global brand and the use of localized content that more closely matches each country's market needs. WorldServer contains a number of powerful functions that help not only manage the complex relationships that exist among localized Web sites, but also process translation workflow tasks in order to rapidly create and synchronize multiple country and/or language specific sites. The following are a number of important concepts within the WorldServer application:

Idiom File System

The Idiom File System (IFS) is the web content interface used in WorldServer. The IFS—an abstract file layer overlaying any current file systems—organizes data from many different sources (file systems, databases, gopher servers) and presents it in a consistent manner. Thus, IFS lets the linkage, workflow and translation components of WorldServer work with your items—be it a file, a database, an XML repository, or even a proprietary format-regardless of where they are stored. Even though the IFS does not actually contain any data, it is structured like a file system tree in that every IFS path points to a piece of data stored elsewhere.

This path from the IFS to the end file is referred to as the "ipath". The end points of the ipath are called "items."

Items

An "item" can be a Hypertext Markup Language (HTML) file, an image, a database, or any other piece of content that is managed using WorldServer. An item is a leaf node (end point) of the IFS tree.

Linkage

Linkage connects Web sites by defining the relationships between items on one site with items in other sites—specifically, a link is a relationship between two items or folders, a master and a slave. WorldServer detects when a changes occurs in the master and, according to Linkage and workflow rules, notifies the user as specified in the workflow that the item needs to be updated. When a request is issued for WorldServer to detect changes and perform the appropriate workflow, this is referred to as performing a "link update". WorldServer provides multiple ways of performing a link update, including the following: 1) One can use the "synchronize sites" functionality on the Manage tab to have linkage detect changes and update all or part of a particular site. 2) From the command line, you can use the update links tool. 3) Using the create a link functionality on the Manage tab, you can create a link that allows you to link part of one site with part of another.

Workflow

WorldServer's workflow component is a very powerful aspect of WorldServer. Workflow is tightly integrated with Linkage, ensuring that any actions taken as a result of Linkage follow workflow processes. A workflow contains the actions that must be performed in order to adapt or translate an item from one web site to another. Each workflow step details the action that needs to be taken as well as the user who will perform the action. Workflows also include "automatic" steps—that is, steps that WorldServer needs to perform instead of a user. For example, if the first event that you want to occur after a change is detected in a master item is that the changed item is copied to a buffer site, an automatic copy step is included in the workflow that details where the item should be copied to. Below are the steps of a typical workflow.

Step 1: WorldServer copies changed item from master site to buffer site.

Step 2: A translate step is assigned to translator A.

Step 3: A review step is assigned to reviewer A. Step 4: WorldServer copies the item from the buffer to the target site.

Masters and Slaves

If an item (e.g., item B) derives its content from another item (e.g., item A), then item A is considered to be the master of item B. A master can have many slaves, but a slave has only one master. This master-slave relationship is key to the concept of Linkage because it defines the dependency of one item or folder on another.

Parent, Child and Ancestor Relationships

As in many file systems, the IFS is based on a hierarchical structure that includes the concepts of parent, child and ancestors. If item B is directly above item C in the hierarchy, item B is the parent of item C. If item A is directly above item B in the hierarchy, item A is the parent of item B and the ancestor of item C.

Meta Data Properties

Each item or folder has many "meta data" properties associated with it, including language, encoding, and default workflow. These property values are inherited from the parent item, unless you specifically overwrite them.

Inheritance of Meta Data Properties

If an item or folder does not have a value for a property (such as language or encoding), the system queries its parent for the property, and the parent queries its parent, until a value for the property is found or the root node is reached. If the property is found in one of the parents, that value is used for the item or folder's property value. A property derived this way is called inherited, whereas a property directly given to the item is called explicit. There are three possible methods of inheritance:

1) "none" means that no metadata is derived from ancestors

2) "copy" means that metadata is copied verbatim from ancestors

3) "append" means that when a property is found in an ancestor, the relative ipath from the ancestor to the current node is appended to the value.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. A method of managing an update of website content, the method comprising:

managing an abstraction layer that organizes data for a plurality of source and target content objects using paths having a consistent format to reference the plurality of source and target content objects, wherein each of the plurality of source and target content objects comprises one of a plurality of resource types, and wherein the abstraction layer defines a unique path for locating the data for each of the plurality of source and target content objects regardless of the corresponding resource type and a corresponding type of data schema used to store each of the plurality of source and target content objects;

managing a set of object links that interfaces with the abstraction layer, wherein each object link comprises an identifier for a source content object for a source website, an identifier for a target content object for a destination website that includes content that is a localized version of at least some of the source website that is customized to differ from the source content according to a locale, and one of a plurality of object link types, wherein each of the plurality of object link types corresponds to a unique localization operation;

receiving a modification of data for the source content object;

obtaining an object link for the source content object from the set of object links;

determining the target content object based on the object link; and updating data for the target content object using the paths for the target content object and the source content object in the abstraction layer based on the modified data for the source content object and the object link type for the object link, wherein the object link type comprises a translate link and wherein the updating step includes:

obtaining a translation definition based on the object link, wherein the translation definition includes a link details ID, a source language and a target language;

obtaining a set of workflow sequence entries based on the link details ID in the translation definition; and performing each workflow sequence entry in the set of workflow sequence entries in a required order to translate the source content object into the target content object by at least one of: translating the source content object from the source language to the target language or localizing the source content object.

2. The method of claim 1, wherein the object link type comprises a copy link and wherein the updating step includes:

ensuring that a resource type for the source content object and a resource type for the target content object are the same; and copying the data from the source content object to the target content object based on the resource type.

3. The method of claim 1, wherein the performing step for one of the set of workflow sequence entries includes:

sending a notification of a required translation step to a user; and receiving confirmation that the required translation step has been completed.

4. The method of claim 1, further comprising:

obtaining a second object link from the set of object links for the target content object;

determining a second target content object based on the second object link; and updating data for the second target content object based on the updated data for the target content object and an object link type for the second object link.

5. The method of claim 1, wherein the updating step comprises:

translating the modified data from a first idiom to a second idiom; and storing the translated modified data as the data for the target content object.

6. The method of claim 5, wherein the first idiom comprises a first language and the second idiom comprises a second language different from the first language.

7. The method of claim 5, wherein the translating step includes converting the modified data from a first data encoding to a second data encoding.

8. The method of claim 1, further comprising generating the object link for the source content object.

9. The method of claim 8, further comprising generating the target content object based on the source content object and the object link, wherein the target content object inherits at least one property from the source content object.

10. The method of claim 8, wherein the generating step includes:

obtaining a project link for a source project that includes the source content object;

obtaining a target project based on the project link;

generating the target content object as part of the target project; and generating the object link between the source content object and the target content object.

11. The method of claim 10, wherein the generating the object link step includes:

obtaining a project link type for the project link; and inheriting the object link type for the object link from the project link type for the project link.

12. A computerized system for managing website content, the system comprising:

a processor;

means for managing an abstraction layer that organizes data for a plurality of source and target content objects using paths having a consistent format to reference the plurality of source and target content objects, wherein each of the plurality of source and target content objects comprises one of a plurality of resource types, and wherein the abstraction layer defines a unique path for locating the data for each of the plurality of source and target content objects regardless of the corresponding resource type and a corresponding type of data schema used to store each of the plurality of source and target content objects;

managing a set of object links that use the abstraction layer, wherein each object link comprises an identifier for a source content object for a source website, an identifier for a target content object for a destination website that includes content that is a localized version of at least some of the source website that is customized to differ from the source content according to a locale, and one of the plurality of object link types, wherein each of the plurality of object link types corresponds to a unique localization operation;

means for receiving a modification of data for the source content object;

means for obtaining an object link for the source content object from the set of object links;

means for determining the target content object based on the object link; and means for updating data for the target content object using the paths for the target content object and the source content object in the abstraction layer based on the modified data for the source content object and the object link type for the object link, wherein the object link type comprises a translate link and wherein the means for updating includes:

means for obtaining a translation definition based on the object link, wherein the translation definition includes a link details ID, a source language and a target language;

means for obtaining a set of workflow sequence entries based on the link details ID in the translation definition; and means for performing each workflow sequence entry in the set of workflow sequence entries in a required order to translate the source content object into the target content object by at least one of: translating the source content object from the source language to the target language or localizing the source content object.

13. The system of claim 12, further comprising means for managing a set of projects, wherein each project comprises a set of content objects for a website.

14. The system of claim 13, further comprising means for managing a set of project links, wherein each project link defines an update relationship between a source project and a target project and wherein each project link comprises one of a plurality of project link types.

15. The system of claim 12, wherein the means for managing the set of object links further generates the object link for the source content object and generates the target content object based on the source content object and the object link, wherein the target content object inherits at least one property from the source content object.

16. The system of claim 12, further comprising means for managing a set of content objects, wherein the set of content objects includes the source content object and the target content object.

17. The system of claim 12, wherein one of the plurality of object link types comprises a translation link type, the system further comprising means for managing a workflow for the translation, wherein the workflow comprises a plurality of workflow sequence entries and wherein each workflow sequence entry defines a required translation step.

18. The system of claim 17, wherein at least one of the required translation steps comprises sending a notification of a required translation step to a user and waiting to receive confirmation that the required translation step has been completed.

19. A computerized system for managing website content, the system comprising:
- a processor;
- means for managing a set of projects, wherein each project comprises a set of content objects for a unique website;
- means for managing a set of project links, wherein each project link defines an update relationship between a source project at a source website and a target project at a destination website that includes content that is a localized version of at least some of the source website that is customized to differ from the source content according to a locale and wherein each project link comprises one of a plurality of project link types, wherein each of the plurality of project link types corresponds to a unique localization operation;
- means for managing a set of object links, wherein each object link defines an update relationship between a source content object in the source project and a target content object in the target project and wherein each object link comprise one of a plurality of object link types;
- means for creating a new source content object in a set of source content objects for the source project;
- means for automatically generating a new target content object in a set of target content objects for the target project based on one of the set of project links;
- means for automatically generating a new object link based on the one of the set of project links, the new source content object, and the new target content object; and
- means for updating data for the target content object based on the modified data for the source content object and the object link type for the object link,
- wherein the object link type comprises a translate link and wherein the means for updating includes:
- means for obtaining a translation definition based on the object link, wherein the translation definition includes a link details ID, a source language and a target language;
- means for obtaining a set of workflow sequence entries based on the link details ID in the translation definition; and
- means for performing each workflow sequence entry in the set of workflow sequence entries in a required order to translate the source content object into the target content object by at least one of: translating the source content object from the source language to the target language or localizing the source content object.

20. The system of claim 19, wherein the means for updating includes means for translating the modified data from a first idiom to a second idiom when the object link type comprises a translate link.

21. The system of claim 19, wherein the means for updating includes means for copying the modified data to the data for the source content object when the object link type comprises a copy link.

22. The system of claim 19, wherein at least one of the set of projects comprises a target project for a first project link in the set of project links and a source project for a second project link in the set of project links and wherein the automatically generating means recursively generate new target content objects and object links.

23. The system of claim 19, further comprising means for managing an abstraction layer that organizes data for a plurality of source and target content objects using paths having a consistent format to reference the plurality of source and target content objects, wherein each of the plurality of source and target content objects has one of a plurality of resource types, and wherein the abstraction layer defines a unique path for locating the data for each of the plurality of source and target content objects regardless of the corresponding resource type and a corresponding type of data schema used to store each of the plurality of source and target content objects.

\* \* \* \* \*

UNITED STATES PATENT AND TRADEMARK OFFICE
CERTIFICATE OF CORRECTION

| | |
|---|---|
| PATENT NO. | : 7,383,320 B1 |
| APPLICATION NO. | : 09/665241 |
| DATED | : June 3, 2008 |
| INVENTOR(S) | : Eric M. Silberstein et al. |

It is certified that error appears in the above-identified patent and that said Letters Patent is hereby corrected as shown below:

On the Title page item (75) Inventors: Inventor - "Chung-Cheih Shan" to be changed to --Chung-Chieh Shan-- as shown on the Official Filing Receipt and the Issue Notification.

Signed and Sealed this

Twenty-first Day of October, 2008

JON W. DUDAS
*Director of the United States Patent and Trademark Office*

UNITED STATES PATENT AND TRADEMARK OFFICE
CERTIFICATE OF CORRECTION

PATENT NO. : 7,383,320 B1  
APPLICATION NO. : 09/665241  
DATED : June 3, 2008  
INVENTOR(S) : Eric M. Silberstein et al.

Page 1 of 1

It is certified that error appears in the above-identified patent and that said Letters Patent is hereby corrected as shown below:

On the Title Page, Item (73) Assignee:

Delete:
"IDOM Technologies, Incorporated, Waltham, MA (US)"

Insert:
-- IDIOM Technologies, Incorporated, Waltham, MA (US) --

Signed and Sealed this

Second Day of December, 2008

JON W. DUDAS  
*Director of the United States Patent and Trademark Office*